(12) United States Patent
Fuchs et al.

(10) Patent No.: US 8,762,831 B2
(45) Date of Patent: *Jun. 24, 2014

(54) XML STREAMING TRANSFORMER (XST)

(75) Inventors: Matthew Fuchs, Los Gatos, CA (US); Changyi Zhu, San Jose, CA (US)

(73) Assignee: Open Invention Network, Durham, NC (US)

( * ) Notice: Subject to any disclaimer, the term of this patent is extended or adjusted under 35 U.S.C. 154(b) by 745 days.

This patent is subject to a terminal disclaimer.

(21) Appl. No.: 12/759,585

(22) Filed: Apr. 13, 2010

(65) Prior Publication Data

US 2010/0199172 A1   Aug. 5, 2010

Related U.S. Application Data

(63) Continuation of application No. 10/222,752, filed on Aug. 16, 2002, now Pat. No. 7,721,202.

(51) Int. Cl.
*G06F 17/00* (2006.01)

(52) U.S. Cl.
USPC ........... 715/236; 715/234; 715/237; 715/239; 715/235; 379/88.13

(58) Field of Classification Search
USPC ................................ 715/234–250; 379/88.13
See application file for complete search history.

(56) References Cited

U.S. PATENT DOCUMENTS

| | | | |
|---|---|---|---|
| 5,557,798 A | 9/1996 | Skeen et al. | |
| 6,012,098 A | 1/2000 | Bayeh et al. | |
| 6,125,391 A | 9/2000 | Meltzer et al. | |
| 6,463,440 B1 | 10/2002 | Hind et al. | |
| 6,487,566 B1 | 11/2002 | Sundaresan | |
| 6,658,625 B1 | 12/2003 | Allen | |
| 6,675,354 B1 | 1/2004 | Claussen et al. | |
| 6,691,104 B1 | 2/2004 | Kraft et al. | |
| 6,718,516 B1 | 4/2004 | Claussen et al. | |
| 6,725,231 B2 | 4/2004 | Hu et al. | |
| 6,772,413 B2 | 8/2004 | Kuznetsov | |
| 6,829,746 B1 | 12/2004 | Schwerdtfeger et al. | |
| 6,836,774 B2 | 12/2004 | Melbin | |
| 6,940,953 B1 * | 9/2005 | Eberle et al. | 379/88.13 |
| 6,961,760 B2 | 11/2005 | Li et al. | |
| 6,996,781 B1 * | 2/2006 | Myers et al. | 715/763 |
| 7,047,488 B2 | 5/2006 | Ingersoll et al. | |
| 7,120,703 B2 | 10/2006 | Li et al. | |
| 7,194,683 B2 | 3/2007 | Hind et al. | |
| 2001/0056504 A1 * | 12/2001 | Kuznetsov | 709/310 |
| 2002/0069157 A1 * | 6/2002 | Jordan | 705/37 |
| 2002/0099735 A1 | 7/2002 | Schroeder et al. | |
| 2002/0122054 A1 | 9/2002 | Hind et al. | |

(Continued)

OTHER PUBLICATIONS

Simon North et al. (Sam's Teach Yourself XML in 21 Days, Sam's Publishing, Indianapolis, IN, Mar. 1999, pp. 309-342, 454-481 and 492-493.*

(Continued)

*Primary Examiner* — Quoc A Tran

(74) *Attorney, Agent, or Firm* — Haynes Beffel & Wolfeld LLP; Ernest J. Beffel, Jr.

(57) ABSTRACT

The present invention includes devices and methods to specify a document transformation. A template specifies a transformation that is applied to a document in a streaming mode, without building a full object tree in memory representing the document.

20 Claims, 16 Drawing Sheets

(56) References Cited

U.S. PATENT DOCUMENTS

| | | | |
|---|---|---|---|
| 2002/0157023 | A1 | 10/2002 | Callahan et al. |
| 2002/0184145 | A1 | 12/2002 | Sijacic et al. |
| 2003/0069975 | A1 | 4/2003 | Abjanic et al. |
| 2003/0120730 | A1 | 6/2003 | Kuno et al. |
| 2004/0010754 | A1 | 1/2004 | Jones |
| 2004/0205549 | A1 | 10/2004 | Yassin et al. |
| 2005/0273772 | A1 | 12/2005 | Matsakis et al. |

OTHER PUBLICATIONS

Editors: Dan Brickley and R.V. Guha, "Resource Description Framework (RDF) Schema fA Specification", W3C Proposed Recommendation Mar. 3, 1999. W3C XP-002203858. available at http://www.w3.org/TRI1999/PR-rdf-schema-19990303, 1-29.

Editors: David Beech et al., "XML Schema Part 1: Structures", W3C Working Draft P-; May 6, 1999, W3C XP. OO2203859, available at http://www.w3.org/1999/05/06-xmlschema-I, I-53.

Editors: Paul V. Biron and Ashok Malhotra, "XML Schema Part 2: Datatypes", World Wide Web Consortium Working Draft May 6, 1999, W3C XP-002203860, available at http://www.w3.org/1999/05/06-xmlschema-2, 1-28.

Kent Brown, "BizTalk: Fluent in E-Business", XP-002203861, Dec. 1-6, 1999.

W. Yeong, T. Howes, S. Kille, "Lightweight Directory Access Protocol", ISODE Consortium, Mar. 1995, 1-19.

R. Moats, "URN Syntax", AT&T, May 1997, 1-7.

Nils Klarlund, Anders Moller, Michael I. Schwartzbach, "Document tq Structure Description 1.0", AT&T and Brics 1999. XP-002203865, 1-34.

K. Nara Y Anaswamy, K.V. Bapa Rao, "An Incremental Mechanism for Schema Evolution in Engineering Domains", IEEE 1988, 294-300.

Editors: Tim Bray, Jean Paoli, C.M. Sperberg-McQueen, "Extensible Markup Language (XML)". World Wide Web Consortium Dec. 8, 1997, W3C XP-002203864, available at http://www.w3.org/TR/PR-xml-971208, 1-32.

A. ,Davidson, M. Fuchs, M. Hedlin, M. Jain, 1. kOISTINEN, C. Lloyd, M. Malone, K. Schwarzhof, "Schema for Object-Oriented XML 2.0", W3C Note Jul. 30, 1999, W3C XP-002203857. available at http://www.w3/org/1999/07INOTE-SOX-19990730, 1-22.

Salz, R., O'Reilly, XML.com: Examining WSDL, May 15, 2002, available at http://www.xml.com/pub/aI2002/05/15/ends.html, 5 pgs.

Glushko article: Advanced Technology Program Close Out Performance Report: Project Title: Component-Based Commerce: The Interoperable Future, Apr. 14, 2000, 8 pages, Publication Status Unclear.

Glushko article: ATP Close Out Performance Report: Component-Based Commerce: The Interoperable Future, 9th Revision, modified Jan. 31, 2000, 57 pages, Publication Status Unclear.

Cover Pages: Web Services Description Language (WSDL), Technology Reports, 155 pages, Jul. 9, 2002, located at http://xml.coverpages.org/wsdl.html.

WebServices Framework & Assertion Exchange Using SAML, XXXX, http://www.w3. org/2001/03/WSWS-popalpaper23/, printed 9/1112002., 1 page.

"Toplink Version 4.0" Webgain, Inc. 2001 consisting of 22 pages.

Pietriga, Emmanuel, et al., "VXT: A Visual Approach to XML Transformations", DocEng 01, Atlanta, GA, Nov. 9-10, 1-10.

Rytkonen, Kimmo, "XSLT Tutorial", XML Finland 2001, TietoEnator, © 2001, slides 1-47 (24 pages).

Christel, Michael G., et al., "XSL T for Tailored Access to a Digital Video Library", JCDL '01, Roanoke, VA, Jun. 24-28, 2001, pp. 290-299 (ACM 1-58113-345-6/01/0006).

Carlisle, David, "Open Math, MathML and XSL", ACM SIGSAM Bulletin, vol. 34 issue 2, Jun. 2000, pp. 6-11 (plus citation page).

Box, Don, et al., Essential XML: Beyond Markup, Addison-Wesley, Boston, MA, Sep. 2000, pp. 31-33, 199-215 and 240-241.

Holzner, Steven, Inside XML, New Riders Publishing, Indianapolis, IN, Nov. 2001, pp. 84-92, 208-211, 234-240, 297-302, 561-605 and 619-671.

"Introduction to the Cocoon Web-publishing framework", Builder UK, May 31, 2002, downloaded from: http://uk.builder.com/programming/java/0,39026609,20265079,00.htm, pp. 1-3.

Roy, Jaideep, et al., -XML: Data's Universal Language, IT Pro, May/Jun. 2000, IEEE 1520-9202100, pp. 32-36.

-SAX Translators: XSLT Translation using XSL TAdapter Filter, Morphis Manual, © 2000, downloaded from: www.morphis.org/manual/trans-xslt.html, pp. 1-3.

O'Reilly Open Source Convention (OSCON 2001) Session Announcement, -Charlie as XML Application Framework-, by Petr Cimprich et al. of Ginger Alliance Ltd., San Diego, CA, Jul. 23-27, 2001, downloaded from: http://conferences.oreillynet.com/cs/os2001/view/e_sess/1388, pp. 1-2.

Cimprich, Petr, et al., -Charlie as XML Application Framework, OSCON 2001 briefing, San Diego, CA, Jul. 2001, slides / downloaded from: www.gingerall.org/ga/html/oscon01/slides/card1.html, pp. 1-32.

Violleau, Thierry, "Java Technology and XML, Part 1—An Introduction to APIs for XML Processing", Sun Microsystems / (java.sun.com/developerItechnicalArticals/xml/JavaTechandXML/) Nov. 2001, pp. 1-22.

Prud'hommeaux, Eric, "Streaming XSL Stylesheets—Was: XML::Writer 0.1 available", Apr. 20, 1999, downloaded from: http://mailman.ic.ac.uk/pipermailxml-dev/1999-Aprill011509.html, pp. 1-3.

Hampton, Kip, "Introducing XML::SAX::Machines, Part Two", XML.com, Mar. 20, 2002, downloaded from: / www.xml.com/Iptla/2002/03/20/machines.html, pp. 1-7.

Diamond, Jason, Template Languages in XSL r, XML.com, Mar. 27, 2002, downloaded from: www.xml.com/Iptla/2002/03/27/templatexslt.html, pp. 1-12.

Johnson, Mark, "Programming XML in Java, Part 1—create Java apps with SAX appeal", JavaWorld, Mar. 2000, downloaded from: www.javaworld.com/javaworld/jw-03-2000/jw-03-xmlsax_p.html, pp. 1-19.

Jirousek, Honza, "Charlie Architecture Overview", Aug. 7, 2000, downloaded from: / www.gingerall.org/ga/html/wp2000/wp_v2.html, pp. 1-13.

Livingstone, Steven, "An Overview of MSXML 4.0", XML.com, Jun. 5, 2002, downloaded from: www.xml.com/lpt/a/2002/06/05/msxml4.html, pp. 1-9.

Hampton, Kip, "High-Performance XML Parsing With SAX", XML.com, Feb. 14, 2001, downloaded from: www.xml.comllpt/a/2001/02/14/perlsax.html, pp. 1-5.

Hampton, Kip, "Transforming XML With SAX Filters", XML.com, Oct. 10, 2001, downloaded from: www.xml.comllpt/a/2001/10/1O/sax-filters.html, pp. 1-8.

Hampton, Kip, "Introducing XML::SAX::Machines, Part One", XML.com, Feb. 13, 2002, downloaded from: www.xml.com/lpt/a/2002/02/13/sax-machines.html, pp. 1-7.

Chase, Nicholas, "Tip: XSL Transformations To and From a SAX Stream—integrate XSL transformations into your SAX applications", Jul. 1, 2002, downloaded from: www-128.ibm.com/developerworks/xml/library/x-tiptraX/index.html, pp. 1-4.

Akireddy, Ravi, "Hybrid XSL Transformation Engine", XML Journal, Apr. 10, 2001, downloaded from: www.sys-con.com/read/40177.htm, pp. 1-6.

Mazzocchi, Stefano, "Introducing Cocoon 2.0", XML.com, Feb. 13, 2002, downloaded from: www.xml.com/Iptla/2002/02/13/cocoon2.html, pp. 1-6.

Punte, Steve, "Getting Started With Cocoon 2.0", XML.com, Jul. 10, 2002, downloaded from: www.xml.com/Iptla/2002/07/10/cocoon2.html, pp. 1-7.

O'Reilly Open Source Convention (OSCON 2002) Session Announcement, "Streaming Transformations for XML", by Petr Cimprich of Ginger Alliance Ltd., San Diego, CA, Jul. 22-26, 2002, downloaded from: http://conferences.oreillynet.com/cs/os2002lview/e_sess/2755, pp. 1-2.

(56) References Cited

OTHER PUBLICATIONS

Cimprich, Petr, "Streaming Transformations for XML", OSCON 2002 briefing, San Diego, CA, Jul. 2002, slides downloaded from: www.gingeralLorg/ga/htmlloscon02Islides/stx-1.html, pp. 1-32.

Euzenat, Jerome, "XML Transformation Flow Processing", Extreme Markup Languages 2001, Montreal, Quebec, Aug. 14-17, 2001, pp. cover & 1-19.

Pfeifer, Craig, "XML Processing with TRaX", ONJava.com, Jul. 2, 2001, downloaded from: www.onjava.com/Ipt/a/966, pp. 1-5.

Maresca, Paolo, et al., "Transformation Dataflow in Multimedia Software Engineering Using TAO_XML: A Component-Based Approach", MDIC 2001, Amalfi, Italy, Sep. 17-18, 2001, pp. 77-89.

North, Simon, et al., Sam's Teach Yourself XML in 21 Days, Sam's Publishing, Indianapolis, IN, Mar. 1999, pp. 309-342,454-481 and 492-493.

Fiebig, Thorsten, et al., "Algebraic XML Construction and its Optimization in NAtix", World Wide Web, vol. 4, No. 3, Sep. 2001, pp. 167-187.

Leslie, Donald M., et al., "Transforming Documentation From The XML Doctypes Used for the Apache Website to DITA: Case Study", SIGDOC '01, Santa Fe, New Mexico, Oct. 21-24, 2001, pp. 157-164.

Vorthmann, Scott (TIBCO Software, Inc.), "The Schema Adjunct Framework: Drafl Nov. 30, 2000",2000, pp. IRS 1 1-22, accessed at: http://web.archive.org/web/2001 0219205703/www.extensibility.com/tibco/resources/saf_dec2000.htm.

Hardley, Marc J., "A Framework for Multilingual, Device Independent Web Sites", XML 2000, Washington, DC, Dec. 3-8, 2000, pp. 211-216.

Valsalakumari, Lakshmi, "An XML-database Interface System", TR-020401, FSU College of Arts and Sciences, Master of Science in Computer Science Thesis, Apr. 2002, pp. 1-66.

Nakano, Keisuke, et al., "Deriving Event-Based Document Transformers from Tree-Based Specifications", Electronic Notes in Theoretical Computer Science, vol. 44, Issue 2, Jun. 2001, pp. 181-205.

Peter Cimprich et al, "Streaming Transformations for XML (STX)", [online], May 17, 2002, <URL:http://web.archive.org/web/20020608154458/stx.gingerall.cz/stx/docs/stx-draft-0.05.html>.

North, Simon, et al., Sam's Teach Yourself XML in 21 Days, Sam's Publishing, Indianapolis, IN, Mar. 1999, pp. 309-342, 454-481 and 492-493.

Leslie, Donald M., et al., "Transforming Documentation From the XML Doctypes Used for the Apache Website to DITA: A Case Study", SIGDOC '01, Santa Fe, New Mexico, Oct. 21-24, 2001, pp. 157-164.

O'Reilly Open Source Convention (OSCON 2002) Session Announcement, "Streaming Transformations for XML", by Petr Cimprich of Ginger Alliance Ltd., San Diego, CA, Jul. 22-26, 2002, downloaded from: http://conferences.oreillynet.com/cs/os2002/view/e_sess/2755, pp. 1-2.

Cimprich, Petr, "Streaming Transformations for XML", OSCON 2002 briefing, San Diego, CA, Jul. 2002, slides downloaded from: www.gingerall.org/ga/html/oscon02/slides/stx-1.html, pp. 1-32.

Chase, Nicholas, "Tip: XSL Transformations To and From a SAX Stream—integrate XSL transformations into your SAX applications", Jul. 1, 2002, downloaded from www-128.ibm.com/developerworks/xml/library/x-tiptrax/index.html, pp. 1-4.

Akireddy, Ravi, "Hybrid XSL Transformation Engine", XML Journal, Apr. 10, 2001, sownloaded from: www.sys-con.com/read/40177.htm, pp. 1-6.

Mazzocchi, Stefano, "Introducing Cocoon 2.0", XML.com, Jul. 10, 2002, downloaded from: www.xml.com/Ipt/a/2002/02/13/cocoon2.html, pp. 1-6.

Punte, Steve, "Getting Started With Cocoon 2.0", XML.com, Jul. 10, 2002, downloaded from: www.xml.com/Ipt/2002/07/10/cocoon2.html, pp. 1-7.

Livingstone, Steven, "An Overview of MSXML 4.0", XML.com, Jun. 5, 2002, downloaded from: www.xml.com/Ipt/a/2002/06/05/msxml4.html, pp. 1-9.

Hampton, Kip, "High-Performance XML Parsing With SAX", XML.com, Feb. 14, 2001, downloaded from: www.xml.com/Ipt/a/2001/02/14/perlsax.html, pp. 1-5.

Hampton, Kip, "Transforming XML With SAX Filters", XML.com, Oct. 10, 2001, downloaded from: www.xml.com/Ipt/a/2001/10/10/sax-filters.html, pp. 1-8.

Hampton, Kip, "Introducing XML::SAX::Machines, Part One", XML.xom, Feb. 13, 2002, downloaded from: www.xml.com/Ipt/2002/02/13/sax-machines.html, pp. 1-7.

Hampton, Kip, "Introducing XML::SAX::Machines, Part Two", XML.com, Mar. 20, 2002, downloaded from: www.xml.com/Ipt/a/2002/03/20/machines.html, pp. 1-7.

Diamond, Jason, "Template Languages in XSLT", XML.com, Mar. 27, 2002, downloaded from: www.xml.com/Ipt/a/2002/03/27/templatesxslt.html, pp. 1-12.

Johnson, Mark, "Programming XML in Java, Part 1—creates Java apps with SAX appeal", JavaWorld, Mar. 2000, downloaded from: www.javaworld.com/javaworld/jw-03-2000/jw-03-xmlsax_p.html, pp. 1-19.

Jirousek, Honza, "Charlie Architecture Overview", Aug. 7, 2000, downloaded from: www.gingerall.org/ga/html/wp2000/wp_v2.html, pp. 1-13.

O'Reilly Open Source Convention (OSCON 2001) Session Announcement, "Charlie as XML Application Framework", by Petr Cimprich et al. of Ginger Alliance Ltd., San Diego, CA, Jul. 23-27, 2001, downloaded from: http://conferences.oreillynet.com/cs/os2001/view/e_sess/1388, pp. 1-2.

Cimprich, Petr, et al., "Charlie as XML Application Framework", OSCON 2001 briefing, San Diego, CA, Jul. 2001, slides downloaded from: www.gingerall.org/ga/html/oscon01/slides/card1.html, pp. 1-32.

Violleau, Thierry, "Java Technology and XML, Part 1—An Introduction to APIs for XML Processing", Sun Microsystems (java.sun.com/developer/technical/Articals/xml/JavaTechandXML/), Nov. 2001, pp. 1-22.

Prud'hommeaux, Eric, "Streaming XSL Stylesheets—Was: XML::Writer 1.0 available", Apr. 20, 1999, downloaded from: http://mailman.ic.ac.uk/pipermail/xml-dev/1999-April/011509.html, pp. 1-3.

Roy, Jaideep, et al., "XML: Data's Universal Language", IT Pro, May/Jun. 2000, IEEE 1520-9202/00, pp. 32-36.

"SAX Translators: XSLT Translation using XSLTdapter Filter", Morphis Manural O 2000, downloaded from: www.morphis.org/manual/trans-xslt.html. pp. 1-3.

Girardot, Marc, et al., "Millau: An Encoding Format for Efficient Representation and Exchange of XML Over the Web", Computer Networks, vol. 33, Jun. 2000, pp. 747-765.

Sundaresan, Neel, et al., "Algorithums and Programming Models for Efficient Representation of XML for Internet Applications", WWW10, Hong Kong, May 1-5, 2001, pp. 366-375 (ACM 1-58113-348-0/01/0005).

Qiang, Cao Xiao, "IBM WebSphere Software Platform for e-Business: XML Review", IBM Solution Enablement Center, May 19, 2001, pp. 1-20 (ACM 1-58113-218-2/00/05).

Tozawa, Akihiko, "Towards Static Type Checking for XSLT", DocEng OI, Atlanta, GA, Nov. 9-10, 2001, pp. 18-27.

Christel, Michael G., et al., "XSLT for TAilored Access to a Digital Video Library", JCDL '01, Roanoke, VA, Jun. 24-28, 2001, pp. 290-299 (ACM 1-58113-345-6/01/0006).

Carlisle, David, "OpenMath, MathML and XSL", ACM SIGSAM Bulletin, vol. 34 issue 2, Jun. 2000, pp. 6-11 (plus citation page).

Box, Don, et al., Essential XML: Beyond Markup, Addison-Wesley, Boston, MA, Sep. 2000, pp. 31-33, 199-215 and 240-241.

Pietriga, Emmanuel, et al., "VXT: A Visual Approach to XML Transformations", DocEng OI, Atlanta, GA, Nov. 9-10, 2001, pp. 1-10.

Rytkonen, Kimmo, "XSLT Tutorial", XML Finland 2001, TietoEnator, O 2001, slied 1-47 (24 pages).

Yeong, W. et al. "Lightweight Directory Access Protocol", ISODE Consortium, Mar. 1995, pp. 1-19.

Moats, R. "URN Syntax", AT&T, May 1997, pp. 1-7.

Klarlund, Nils et al. "Document Structure Description 1.0", AT&T and BRICS 1999, XP-002203865, pp. 1-34.

(56) References Cited

OTHER PUBLICATIONS

Narayanaswamy, K. et al. "An Incremental Mechanism for Schema Evolution in Engineering Domains", IEEE 1988, pp. 294-300.
Bray, Tim et al., editors. "Extensible Markup Language (XML) 1.0", World Wide Web Consortium Dec. 8, 1997, W3C XP-002203864, available at http://www.w3.org/TR/PR-xml-971208, 1-32.
Davidson, A. et al. "Schema for Object-Oriented XML 2.0", W3C Note Jul. 30, 1999, W3C XP-002203857, available at http://www.w3.org/1999/07/NOTE-SOX-19990730, 1-22.
Brickley, Dan and R.V. Guha, editors. "Resource Description Framework (RDF) Schema Specification", W3C Proposed Recommendation Mar. 3, 1999, W3C XP-002203858, available at http://www.w3.org/TR/1999/PR-rdf-schema-19990303, 1-29.
Beech, David et al., editors. "XML Schema Part 1: Structures", W3C Working Draft May 6, 1999, W3C XP-002203859, available at http://www.w3.org/1999/05106-xmlschema-1, 1-53.
Biron, Paul V. and Ashok Malhotra, editors. "XML Schema Part 2: Datatypes", World Wide Web Consortium Working Draft May 6, 1999, W3C XP-002203860, available at http://www.w3.org/1999/05106-xmlschema-2, 1-28.
Brown, Kent. "Biztalk: Fluent in E-Business", XP-002203861, Dec. 1-6, 1999.
Vorthmann, Scott (TIBCO Software, Inc.), "The Schema Adjunct Framework: Draft Nov. 30, 2000", 2000, pp. 1-22, accessed at: http://web.archive.org/web/20010219205703/www.extensibility.com/tibco/resources/saf_dec2000.htm.
Hadley, Marc J., "A Framework for Multilingual, Device Independent Web Sites", XML 2000, Washington, DC, Dec. 3-8, 2000, pp. 211-216.
Office Action, U.S. Appl. No. 10/222,752, mailed Jan. 13, 2005, pp. 1-21.
Response to Jan. 13, 2005 Office Action, U.S. Appl. No. 10/222,752, pp. 1-20.
Final Office Action, U.S. Appl. No. 10/222,752, mailed Aug. 24, 2005, pp. 1-19.
Response to Aug. 24, 2005 Final Office Action, U.S. Appl. No. 10/222,752, filed Nov. 13, 2005, pp. 1-17.
Noitce of Appeal, U.S. Appl. No. 10/222,752, filed Dec. 30, 2005, pp. 1.
Office Action, U.S. Appl. No. 10/222,752, mailed Mar. 30, 2006, pp. 1-18.
Resp to Mar. 30, 2006 Office Action, U.S. Appl. No. 10/222,752, filed Sep. 29, 2006, pp. 1-10.
Office Action, U.S. Appl. No. 10/222,752, mailed Nov. 1, 2007, pp. 1-14.
Resp to Jan. 11, 2007 Office Action, U.S. Appl. No. 10/222,752, filed May 1, 2008, pp. 1-13.
Final Office Action, U.S. Appl. No. 10/222,752, mailed Aug. 14, 2008, pp. 1-20.
Pre-appeal brief, U.S. Appl. No. 10/222,752, filed Feb. 13, 2009, pp. 1-5.
RCE and Amendment afer Notce of Appeal, U.S. Appl. No 10/222,752, filed May 13, 2009, pp. 1-21.
Notice of Allowance, U.S. Appl. No. 10/222,752, mailed Nov. 3, 2009, pp. 1-7.

* cited by examiner

```
<schema xmlns:xsd="http://www.w3c.org/2001/XMLSchema">

<xsd:element name="templates">
<xsd:complexType>
<xsd:sequence>
<xsd:element ref="include" minOccurs="0"/>
<xsd:element ref="template" minOccurs="1"/>
</xsd:sequence>
<xsd:attribute name="name" type="xsd:string" use="required"/>
<xsd:attribute name="version" type="xsd:string" fixed="1.0"/>
<xsd:anyAttribute/>
</xsd:complextype>
</xsd:element>

<xsd:element name="template">
<xsd:complexType>
<xsd:sequence>
<xsd:any/>
</xsd:sequence>
<xsd:attribute name="match" type="xsd:string" use="required"/>
<xsd:attribute name="namespace" type="xsd:string" use="optional"/>
<xsd:attribute name="copy" type="xsd:boolean" default="false"/>
<xsd:attribute name="deferred type="xsd:boolean" default="false"/>
<xsd:attribute name="alias" type="xsd:string" use="optional"/>
<xsd:attribute name="domsrc" type="xsd:string" use="optional"/>
<xsd:attribute name="skip" type="xsd:string" use="optional"/>
<xsd:attribute name="param" type="xsd:string" use="optional"/>
<xsd:attribute name="friend" type="xsd:string" use="optional"/>
</xsd:complexType>
</xsd:element>

<xsd:element name="var-of">
<xsd:complexType>
<xsd:attribute name="select" type="xsd:string" use="required"/>
<xsd:attribute name="dom" type="xsd:string" use="optional"/>
</xsd:complexType>
</xsd:element>

<xsd:element name="var">
<xsd:complexType>
<xsd:attribute name="name" type="xsd:string" use="required"/>
<xsd:attribute name="select" type="xsd:string" use="required"/>
<xsd:attribute name="dom" type="xsd:string" use="optional"/>
</xsd:complexType>
</xsd:element>
<xsd:element name="attribute">
```

Fig. 15A

```
<xsd:element name="attribute">
<xsd:complexType>
<xsd:attribute name="name" type="xsd:string" use="required"/>
<xsd:attribute name="select" type="xsd:string" use="required"/>
</xsd:complexType>
</xsd:element>

<xsd:element name="if">
<xsd:complexType>
<xsd:sequence>
<xsd:any minOccurs="0"/>
</xsd:sequence>
<xsd:attribute name="test" type="xsd:string" use="required"/>
</xsd:complexType>
</xsd:element>

<xsd:element name="choose">
<xsd:complexType>
<xsd:attribute name="select" type="xsd:string" use="required"/>
<xsd:attribute name="dom" type="xsd:string" use="optional"/>
</xsd:complexType>
</xsd:element>

<xsd:element name="when">
<xsd:complexType>
<xsd:sequence>
<xsd:any minOccurs="0"/>
</xsd:sequence>
<xsd:attribute name="test" type="xsd:string" use="required"/>
</xsd:complexType>
</xsd:element>

<xsd:element name="otherwise">
<xsd:complexType>
<xsd:sequence>
<xsd:any/>
</xsd:sequence>
<xsd:attribute name="test" type="xsd:string" use="optional"/>
</xsd:complexType>
</xsd:element>

<xsd:element name="comment">
<xsd:complexType>
<xsd:sequence>
<xsd:any/>
</xsd:sequence>
</xsd:complexType>
</xsd:element>

<xsd:element name="fall-back">
<xsd:complexType>
```

Fig. 15B

```
<xsd:sequence>
<xsd:any minOccurs="0"/>
</xsd:sequence>
</xsd:complexType>
</xsd:element>

<xsd:element name="include">
<xsd:complexType>
<xsd:attribute name="href" type="xsd:anyURI" use="required"/>
</xsd:complexType>
</xsd:element>

<xsd:element name="load-template">
<xsd:complexType>
<xsd:sequence>
<xsd:element ref="with-param" minOccurs="0" />
<xsd:element ref="fall-back" minOccurs="0" maxOccurs="1"/>
</xsd:sequence>
<xsd:attribute name="select" type="xsd:string" use="required"/>
<xsd:attribute name="name" type="xsd:string" use="required"/>
</xsd:complexType>
</xsd:element>

<xsd:element name="for-each">
<xsd:complexType>
<xsd:sequence>
<xsd:any/>
</xsd:sequence>
<xsd:attribute name="dom" type="xsd:string" use="required"/>
</xsd:complexType>
</xsd:element>

<xsd:element name="message" type="xsd:string"/>

<xsd:element name="redirect">
<xsd:complexType>
<xsd:attribute name="eref" type="anyURI" use="required"/>
</xsd:complexType>
</xsd:element>

<xsd:element name="with-param">
<xsd:complexType>
<xsd:attribute name="name" type="xsd:string" use="required"/>
<xsd:attribute name="select" type="xsd:string" use="required"/>
</xsd:complexType>
</xsd:element>

</xsd:schema>
```

Fig. 15C

XML STREAMING TRANSFORMER (XST)

RELATED APPLICATIONS

This application is a continuation of U.S. application Ser. No. 10/222,752, filed on 16 Aug. 2002, entitled XML Streaming Transformer (XST).

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to systems and methods for fixed and extremely low memory usage transformation of a document treated as a stream of discrete processing events instead of requiring representation of hierarchical relationships between all elements to be constructed and necessitating traversal of this hierarchical object representation of the document in order to accomplish transformation. More particularly, it relates to systems and protocols for transforming XML documents.

Business-to-business (B2B) and application-to-application (A2A) electronic commerce are replacing former protocols for electronic data interchange (EDI). As businesses strive to improve their efficiency with B2B and A2A systems, a number of incompatible platforms and competing standards have emerged. One need that has been identified is to transform XML documents, typically converting the documents from one system to another. Another reason for transformation is that a standard may have gone through several versions and one end may use the older version the other the newer.

XML has become a widely used type of data because the rigid rules that must be applied to create inline markup make it relatively simple for computer programs to interpret and process the content of textual documents. For example, a purchase order written in XML can be processed by an order entry software application that knows how to read the markup annotations that describe what is being purchased, who the purchaser is, and so forth. Thus, a third reason for a transformation would be to take the information in the purchase order and to use it to produce a response document such as a Shipping Bill containing the purchaser, the items being purchased and other information copied from the first document.

Transformation is a major category of computer processing. A paperless system for transacting business could, in a large-scale marketplace, require the transformation of many thousands of XML documents a day. The XML documents are often quite large in size, with many thousands of individual data elements which must be handled in the transformation. The rules expressing the conversion from input to output may also be very extensive. The response time necessary to complete an individual transformation may be excessively long and the overall demand on computer resources for supporting an enterprise-scale transformation service may grow rapidly to unacceptable proportions.

While there are many different tools which accomplish XML transformation, there is a lack of tools effectively designed to address the issue of performance. The most popular technology used today, XSLT, exacerbates the performance problem by requiring an internal data model that typically is extremely costly in computer resources. Some attempts have been made to alleviate these problems by compiling XSLT conversion statements into a more efficient programming language such as Java or by caching schemes. These approaches do not alter the basic process that is causing the inefficiency.

Accordingly, an opportunity arises to devise methods and structures that efficiently specify and implement XML document transformations.

SUMMARY OF THE INVENTION

The present invention relates to systems and methods for fixed and extremely low memory usage transformation of a document treated as a stream of discrete processing events instead of requiring representation of hierarchical relationships between all elements to be constructed and necessitating traversal of this hierarchical object representation of the document in order to accomplish transformation. Particular aspects of the present invention are described in the claims, specification and drawings.

BRIEF DESCRIPTION OF THE DRAWINGS

FIG. 15A-C is a schema for an embodiment of XST.

DETAILED DESCRIPTION

Figure 1:
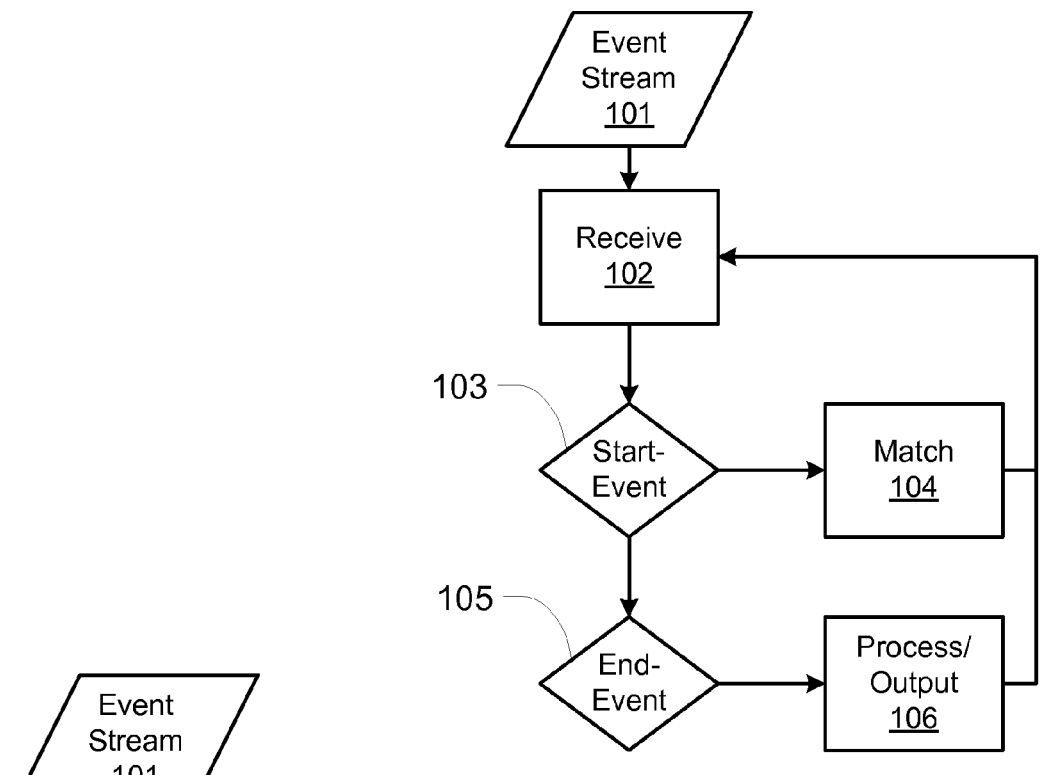
FIG. 1 is a high-level block diagram of a transformation process.

The following detailed description is made with reference to the figures. Preferred embodiments are described to illustrate the present invention, not to limit its scope, which is defined by the claims. Those of ordinary skill in the art will recognize a variety of equivalent variations on the description that follows.

XST is a transformation technology. Transformation is the mutation of an input source into an output using a set of a deterministic set of rules that describe the mutation. In one embodiment, XST operates on source data marked up in XML or a similar structured and tagged markup language. XML data is annotated by inline markup conforming to syntax rules of XML. The output of an XST transformation is textual data, which also may be an XML document.

An XST transformation is described by a set of rules contained in a template. These rules are expressed in a language. Transformation languages resemble general-purpose programming languages but provide only the expressiveness needed to describe the mutations needed to mutate from legal inputs to legal outputs. When the legal inputs are limited to XML or similar structured and tagged documents, the problem space is quite limited compared to general transformation. Transformations are therefore easier for programmers to write and the implementation of a processor to compute transformation described in templates is an easier task. Templates define the significant input events in sequential processing of the source document where transformation operations occur. In one embodiment, the input event definition and associated transformation operations can be called subtemplates. It is at the subtemplate level that streaming to output takes place. Numerous examples follow.

Even with the limited scope of XML transformation, it is possible to devise many different approaches to transformation languages. The most common type of language, of which XSLT is a good representative, is one where the XML input document is manipulated as a tree of nodes. For XML documents, this provides a way to describe transformations that is generally thought to be intuitive and to provide wide expressiveness that allows the transformation programmer to express almost any transformation process with relative ease. The problem with this type of language is that it forces the underlying implementation to actually convert an entire XML document into a tree of nodes and to perform the manipulations required by the transformation as tree-based node operations. The conversion of the XML document to a tree is a costly operation and subsequent operations on the tree may also be very costly, especially if a great deal of backtracking between nodes is required. Typically, the entire XML document is converted to a tree in memory and this tree occupies several times the size of the document compared to its representation as a byte stream. Various optimizations to reduce the amount of memory needed to store the tree are, of course, possible, but they are prohibitively difficult to implement. And these optimizations may require tradeoffs of slower performance for better memory usage. For these and other reasons, the underlying implementations of the tree-oriented type of transformation language are not optimized in the area of tree representation or tree size.

The XST transformation language is deliberately restricted to enable a more efficient underlying implementation of the transformation process. In studying hundreds of existing transformations, the observation was made that the majority of them do not require the expressiveness of a fully tree-based language. XST uses a simpler paradigm for its basic, default processing and uses more complex and costly constructs only where they are required, for specific fragments of an XML document. The XST approach also accepts that for certain classes of transformations, templates may be difficult to write and performance may be no better than with tree-based languages. Accordingly, XST can provide high-performance for the large class of transformations that can be readily expressed in a more limited idiom.

In order to process an XML input stream, the stream is scanned in order to recognize inline markup and the content annotated by the inline markup. The recognition of markup and content produces so-called "events" and the process is sometimes called "event-stream parsing". An additional, more complex process is required to form a tree of nodes capturing the hierarchical relationships between content items from these events. In constrained circumstances, XST can process an event stream forming a tree of nodes, even in a single pass through an XML document. Single pass, non-tree processing may use relatively small buffers, enabling memory usage to be kept very small. Processing time may, despite the small buffers, be faster because time is not spent to construct the tree or to make multiple passes over the tree to process a transformation.

Application of event-stream parsing to XML document transformation is innovative. The XST language is carefully designed to allow the bulk of transformation processing to be implemented using the efficient event-stream parsing method. Several aspects of XST extend event-stream parsing to a large class of transformation problems. Mutable variables can be used in event-stream processing to forward-reference information from prior events and to compute context-specific values. Portions of the output stream can be divided and directed to multiple output targets. Java methods and other external processing routines can be invoked from events. In some embodiments, XST allows for the possibility of mixing tree-based node processing into an event-stream process by allowing trees to be constructed on fragments or subsections of a document. XST also allows additional event handlers to be chained together before and after the main XST transformation event handler.

FIG. 1 is a high-level block diagram of event processing. The event processing depicted here operates on named template elements, transforming an electronic commerce document, preferably one represented in XML, but more generally including documents comprising character data encoding text characters and markup data identifying sets of storage units according to a logical structure of any document. Many options are illustrated or described below that can be utilized in various combinations. A parser generates an event stream 101 corresponding to the electronic commerce source, which may be a file or any blob or stream of data. Software hosted on a computer system is adapted to receive events 102 generated by the parser corresponding to the electronic document source. In some embodiments, the events include element start-events 103, input events and element end-events 105. In other embodiments, the parser may pass tokens and the system may be adapted to generate events from the tokens. In yet other embodiments, a character stream may be received and parsed to generate tokens or events. Responding to an element start-event 103, a computer-assisted system matches an element to a named template 104. This may be accomplished by matching an element name, passed as part of the element start-event, with the corresponding name of an element template. A plurality of template instances, as illustrated in other figures, may be stored in a tree in memory. Alternatively, the template instances may be stored in another data structure, for instance one accessible by a simple API for XML (SAX). In some embodiments, a plurality of template instances are stored together in a templates source. Lacking a match, the element represented by the start-event is treated as content of its parent element. An XST transformation should include a template element that matches a root element of an electronic commerce document. So constrained, a child element that lacks a matching template can be treated as content of its parent element. Content of an element may include all of what appears between the token(s) that trigger an element start-event and the token(s) that trigger an element end-event. Content may or may not include nested sub elements. Content, may or may not include attributes of an element, for instance, attributes of an XML-formed element. In the case of a match between an element represented by an element start-event and a named template or subtemplate from the templates source, the system activates the named template. When processing reaches an element end-event 105, the system attempts to match the element with a corresponding activated named template. This attempt fails if the corresponding element start-event did not match a named element. In the case of a match with the corresponding activated named template, processing is performed 106. Processing may include output of both literal text from the template and input events from the stream. Responsive to instructions in the activated named template, the system outputs literal text or content from input events corresponding to the current element. Having processed the content of the current element, the system can clear the input events, for instance, from an input buffer. The activated named template can be deactivated.

This embodiment may be enhanced by use of mutable variables with the templates. The variables can be activated for the processing of a document or may be limited in scope to processing of a named template (including any nested named templates.) Response to an element start-event may include activating one or more variables; response to a corresponding end-event may include deactivating the variables. Input stream values may be assigned to mutable variables or to un-named, non-mutable variables. Mutable variables may be changed using substring, concatenation or other operators. Processing an end-event and corresponding template may include manipulating the variables. Variables may be manipulated by external processing routines, such as Java methods.

This embodiment further may be enhanced by use of flow of control operators in a template. The flow of control operators may be as simple as "if" and "choose". They may further include "for-each," "when," and "otherwise" operators. Constructs such as "else" and "then-else" also may be used. Some flow of control operators operate on a fragment or subsection of the input document that is converted into a tree structure.

Figure 2:
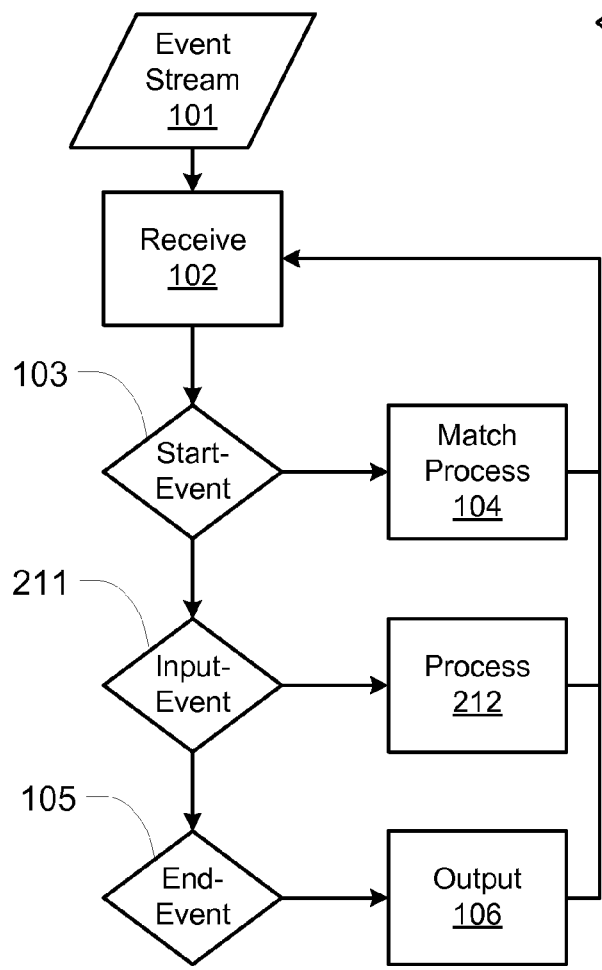
FIG. 2 is also a high-level block diagram, depicting separate processing of input-events and end-events.

FIG. 2 is an alternate high-level block diagram of event processing. This event processing also operates on named template elements. An event stream 101 is generated by a parser separate from the system or by a component of the system. The processing module receives 102 the event stream. It matches 104 element start-events 103 as described above. In response to a match, the system may set up one or more variables to store content, attributes, or labels corresponding to an element. Depending on the structure of the template elements, the variables have a local or global scope. When the variables have local scope, they are active as long as the corresponding named template is active. When the variables have global scope, they are active throughout transformation of the document. The system generally processes end-events 105 by the output process 106 described above. In addition to processing (104, 212, 106) literal text from the template and input events 211 from the stream, processing also may include manipulating the variables, including assigning parts of the input stream to the variables and performing logical, string, arithmetic or other operations on the variables. The content of the variables, either manipulated or not, may be output. Processing may further include flow of control instructions, as described above, and invocation of external processes. The external processes may include Java classes and methods, as further described below.

In a first embodiment, the XST template language supports the following three processing commands: <xst:template> is an opening tag of an XST template and is used to store more than one template in one file. <xst:pi> is an opening tag of XST processing instructions. <xst:var> is an opening tag of an XST variable.

In an alternative embodiment, processing commands are treated as attributes of a template and a "templates" markup is provided as a parent to multiple instances of a "template" markup.

An XST template is a text file that includes string literals and template variables. Variables have the form <xst:var>variableName</xst:var> with an opening tag of "<xst: var>" and a closing tag of "</xst:var>". The variables provide the bindings between the template and its corresponding source XML document.

A transformation begins with the parsing of an XML document. As XML documents have a root element, XST transformations have a root template. If the name of the element is root, then the template may be named root.tpl, combining of the name of the root element and the extension, ".tpl", where root is some arbitrary element name. A child template may be attached to a parent template through its parent element in the XML document.

In alternative embodiments, the XST transformation engine can operate in either streaming or buffered mode. The intermediate output of a transformation, like the template, includes string literals and template variables. In streaming mode, the transferred output of each template is streamed out upon deactivating or unloading of the template. In buffered mode, the results of the transformation are output and intermediate storage is flushed out at the end of the transformation or until deactivation of a parent template. The order of elements in the output can be different from that of the input document, within each template.

By design, the XST transformation reuses loaded templates. In one implementation, a list of loaded templates for an XML document is saved under the name of the root template of that document. All the lists are saved in memory for fast access. To minimize the usage of memory the engine writes out the transformed results to the target output stream, as practical.

An XST transformation corresponding to an XML document includes one or more templates corresponding to elements of the XML document. Multiple templates can be stored in a single file. A simple string comparison of the name of an element in an XML document and that of a template determines if a matching template exists that should be activated or loaded during a transformation. Template names may be qualified by a namespace name.

The XST transformation engine provides public interfaces to transform an XML document using either a default XML parser/reader or a user selected one. It also supports a Java API for XML parsing (JAXP) interface. The engine runs as either a stand alone service or a part of other services.

Figure 3:
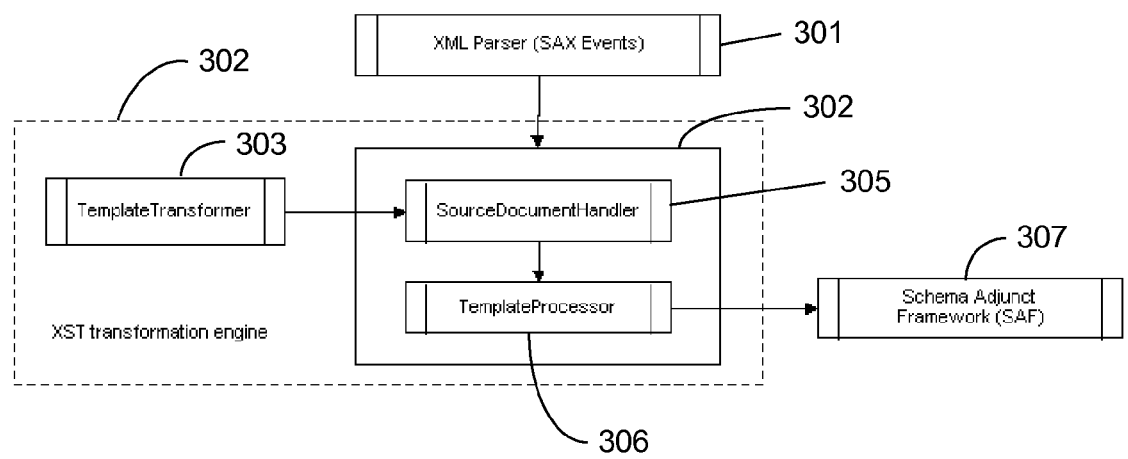
FIG. 3 is a high-level block diagram of an XST transformation engine.

A first embodiment of the XST transformation engine 302 includes template transformer 303, source document handler 305 and template processor 306 modules, as shown in FIG. 3. The template transformer 303 provides the public interface to transform an XML document using XST. The source document handler 305 is registered as the content handler to receive various SAX events from an XML reader/parser 301 and pass them to the template processor 305. The template processor 306 handles the SAX events from the XML parser 301. It also provides the mechanism to cache/reuse a loaded template and lookup the value of an element using the rules specified in the Schema Adjunct Framework (SAF) 307.

Figure 4:
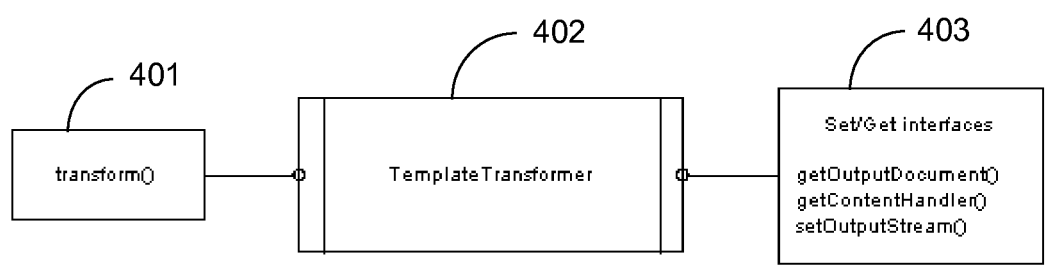
FIGS. 4 through 6 provide additional detail of elements that appear in FIG. 3.

As shown in FIG. 4, the template transformer 402 provides the following public interfaces 401, 403 to (1) transform an XML document using either a default XML reader/parser or a user selected one; (2) get the content handler which can be used with other XML transformers/adapters to handle the SAX events; (3) set the output stream; and (4) get the output document of a transformation.

Figure 5:
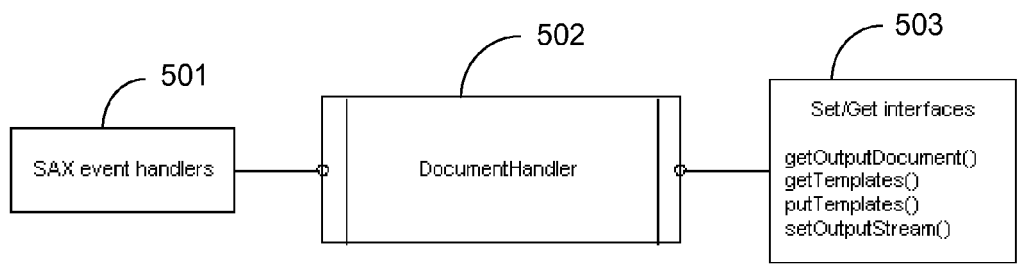

As shown in FIG. 5, the document handler 502 provides the public interfaces 502 to (1) get the output document; (2) set the output target stream; (3) get a list of the currently used templates on the stack; and (4) put a list of templates on the stack to use. It also provides interfaces of SAX event handlers 501 which simply pass the events to its template processor.

Figure 6:
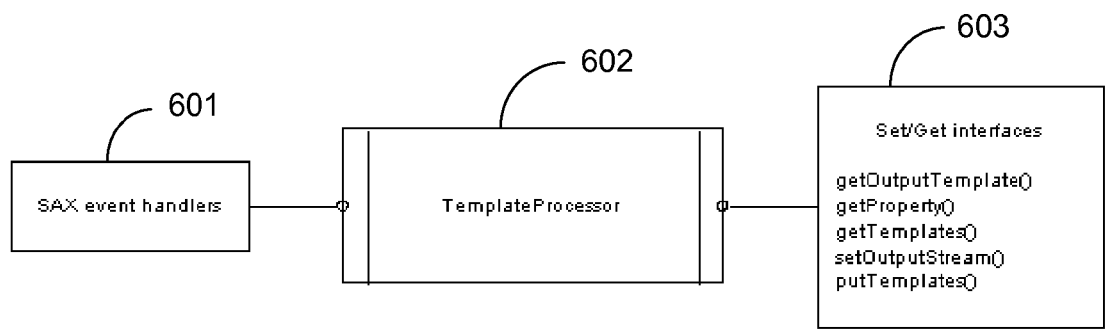

In addition to set/get interfaces provided by the document handler 502, the template processor 602 also provides a method getProperty( ) 603 to look up a property using SAF 307, as shown in FIG. 6. Five interfaces of the SAX event handler 601 have been provided for the XST transformation 603. Handler startDocument( ) calls the method reset( ) to reset the states of some of the instance variables of the template processor. Handler endDocument is reserved. The process flows for startElement, characters or input, and endElement events generated by a SAX processor and handled by SAX event handlers are shown in FIGS. 7-9, respectively.

Figure 7:
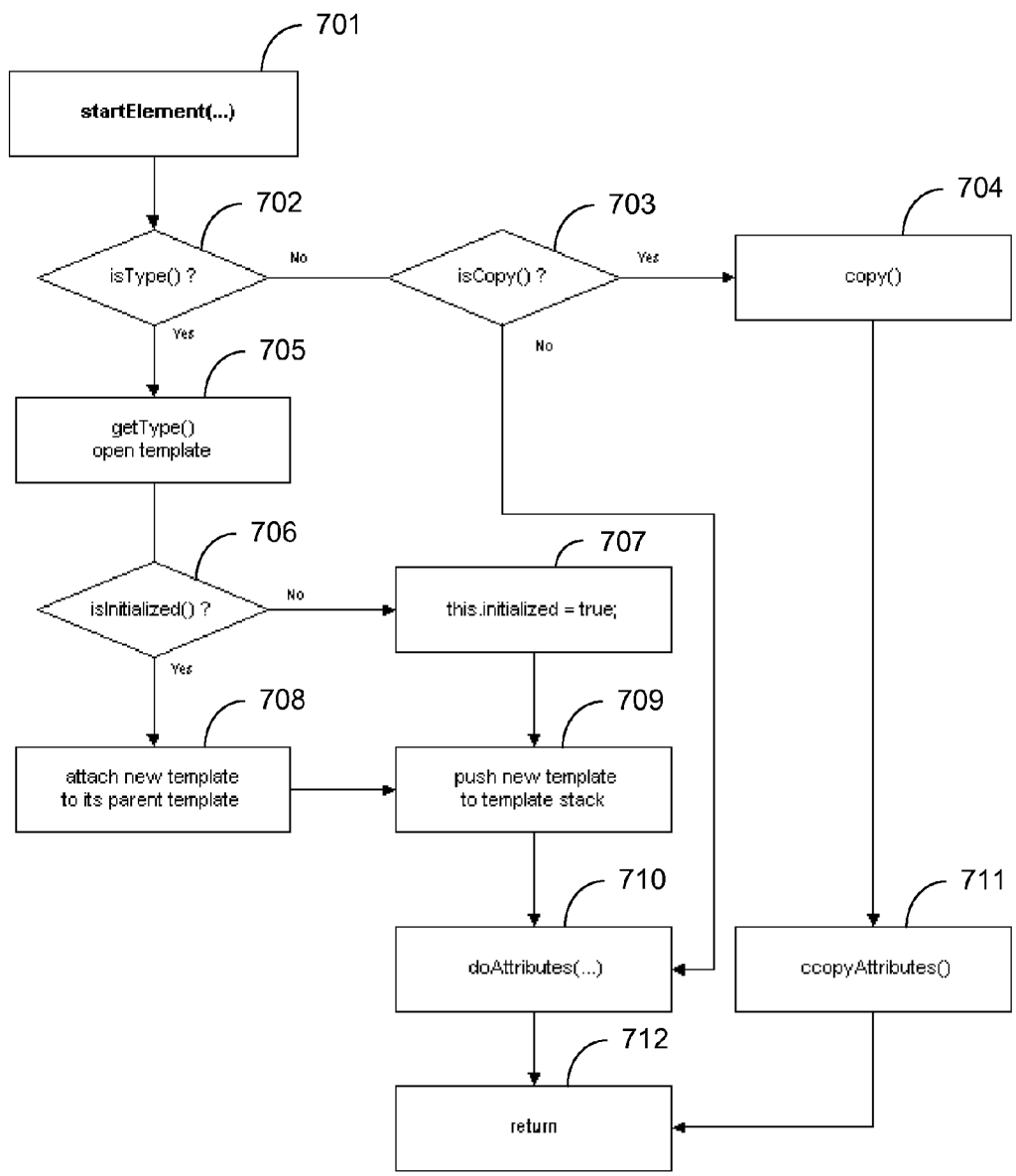
FIGS. 7 through 9 are flowcharts, in one embodiment, for processing events in an event stream.

FIG. 7 depicts the flow within a startElement module. In this embodiment, the startElement module is invoked with parameters that may represent an abstract data type, such as data types compliant with Document Type Definition (DTD), XML-Data Reduced (XDR), Document Content Description (DCD) for XML, Schema for Object-oriented XML (SOX), Document Definition Markup Language (DDML), XML Schema, Regular Language Description for XML (RELAX/Core/NG), Tree Regular Expressions for XML (TREX), or Schematron. At step 702, the input is tested to determine whether to load a schema and template. Step 705 includes getting the schema and template. For a particular abstract data type, an abstract tree is created and can be queried. The logical branch at step 706 depends on whether a root template has been initialized. If so, the template being opened is attached to its parent template at step 708. If not, the template being opened is the root template, and a flag is set in step 707. In step 709, the newly activated template is pushed onto a template stack. In step 710, which may be reached from 709 or 703, attributes of an element are processed. When the element is encoded using XML, the attributes are XML attributes. Upon completion of attribute processing, the routine returns. Again at step 702, if the element being processed does not correspond to a named template, the next decision fork 703 determines whether the most recently activated template is set to copy the contents of the corresponding element. At this point, a sub-element is treated as content of its parent element. If copy is set, processing proceeds to 704, which sets up copying and to 711 which copies attributes passed when the startElement method is invoked, before returning at step 712. If the template is not set to copy the contents, then the input stream corresponding to the current element is not copied to output. From 703 to 712, the method returns.

Figure 8:
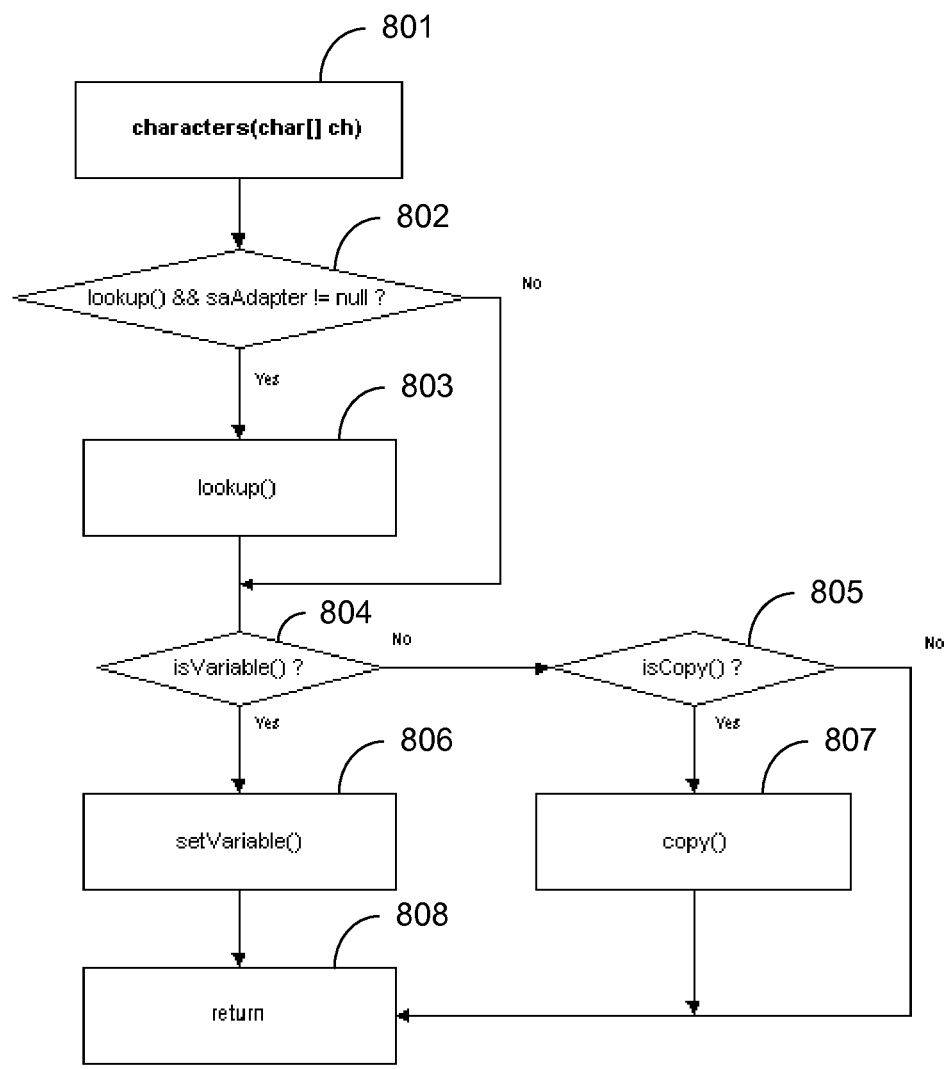

FIG. 8 depicts the flow within a module processing an input stream 801. In this embodiment, the first logical branch 802 uses the method lookup( ) to determine whether a schema adjunct framework applies to processing this input stream. There must both be an applicable schema adjunct framework and it must be accessible (< > null). If a schema adjunct framework is applicable and available, it is applied 803. The next processing branch determines whether a variable exists with the same name as the current element. If a variable exists for the current element, a set variable method may be called 806 to transfer all or part of the input stream to the variable, before returning 808. If no variable exists for the current element, the logical branch 805 determines whether a copy instruction or attribute has been invoked. If so, a copy( ) method 807 is invoked. If not, or after copying, the method returns 808. With minor modification, the processing of a temporarily buffered input events stream can be postponed until an element end-event.

Figure 9:
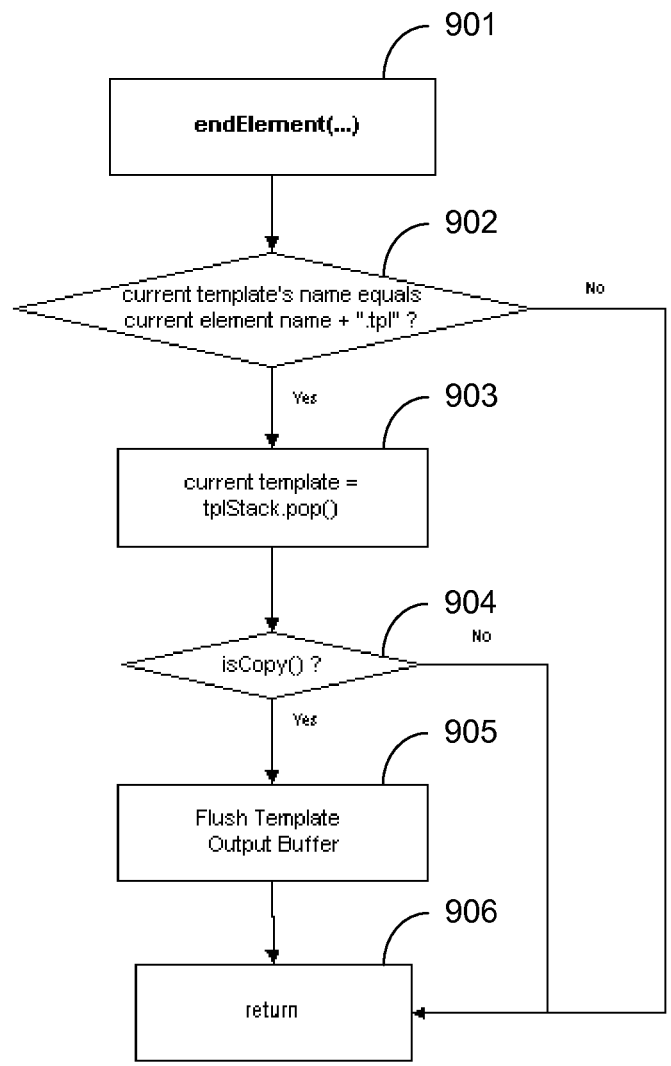

FIG. 9 depicts the flow within a module processing an end-element event 901. The first logical branch 902 matches the currently active template to the element that is ending. This may be done by matching a name passed as a parameter to the method with part of the current template's name. In the flow chart, the approach depicted is to concatenate the extension ".TPL" to the name of the element and to match that against the current template, though any chosen extension may be used. In embodiments that process input events on an ongoing basis, the lack of a match leads to a method return 906. In embodiments that postpone processing temporarily buffered input events until an element end-event, some processing may be performed, for instance copying of partial contents of an element, even if there is no match for the element end-event. In case of a match, in embodiments that store templates on a stack, the current template is popped off the stack for processing 903. The next logical branch 904 determines whether a copying instruction or attribute is effective. If so, a buffer can be output and flushed 905. Processing then continues in either case 904 or 905, with the method return 906.

Figure 10:
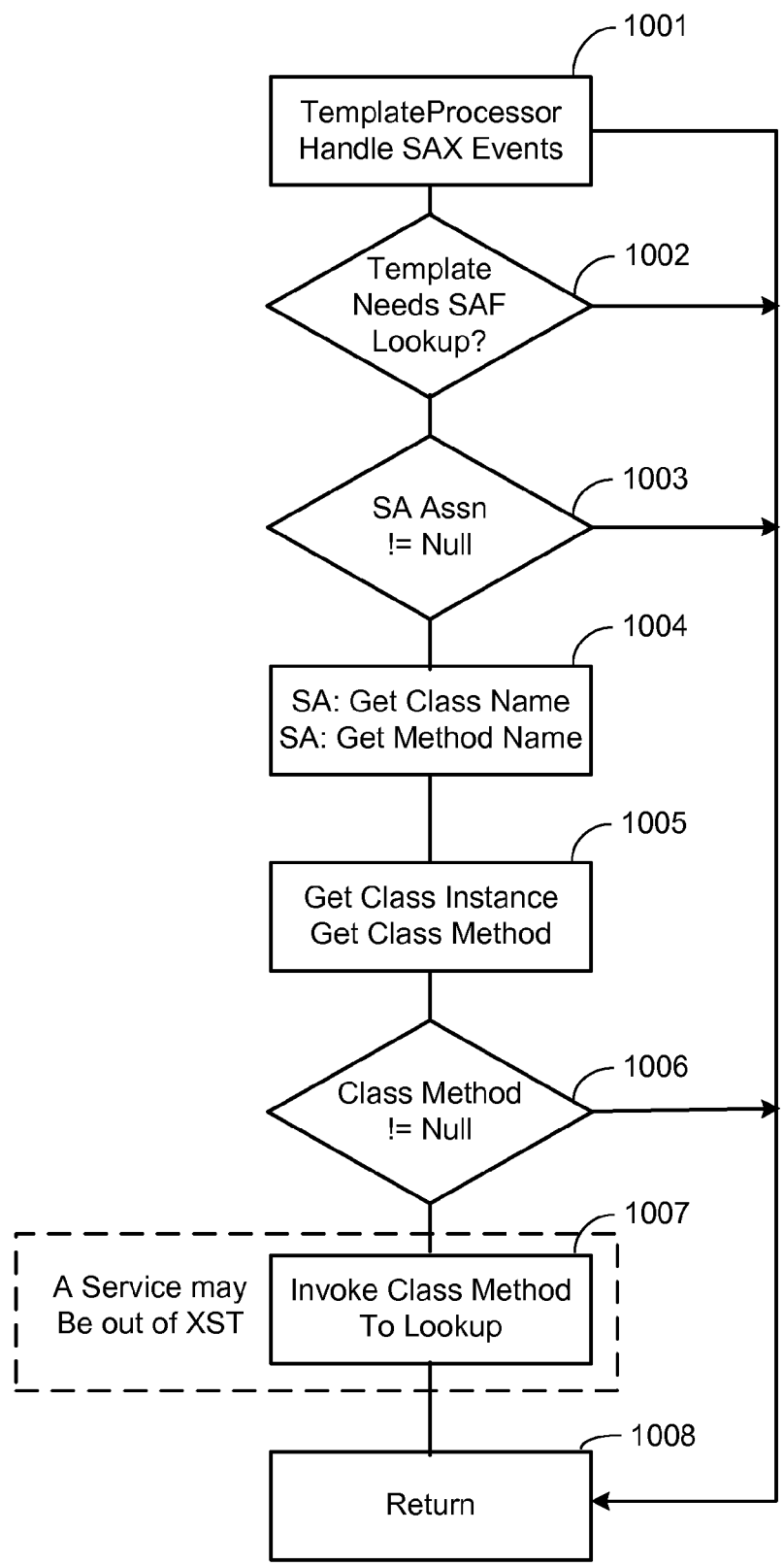
FIG. 10 is a flowchart for processing lookups against a schema adjunct framework, which may be used in one embodiment.

FIG. 10 is a block diagram for the process flow, in the first embodiment of XST using a schema adjunct framework. A general framework Schema Adjunct Framework has been integrated into this embodiment of XST to allow users to specify additional information about the structures or properties of an XML document to be transformed. A Schema Adjunct is an XML document that contains additional, application-specific or domain-specific data relative to a particular schema. Additional information regarding SAF technology appears in Vorthmann, S. et al., "The Schema Adjunct Framework," accessible on Aug. 31, 2009 at http://web.archive.org/web/20010219205703/www.extensibility.com/tibco/resources/saf_dec2000.htm.

A template processor 1001 handles certain events in the event stream, generally corresponding to the lookup( ) method 803 in FIG. 8. For a particular element, the logical branch 1002 determines whether an SAF lookup is required. If not, the method returns 1008. If so, the next logical branch 1003 determines whether the required SAF is accessible. If not, the method returns 1008. In one embodiment, the schema adjunct framework invokes a Java application. The template processor gets the class name and method name 1004 and then gets a class instance and class method 1005. If the class method is not null 1006, it is invoked 1007. Invoking the class method may involve invoking a service external to XST. After the class method has been invoked and returns, the template processor returns 1008.

The following example illustrates use of SAF to provide the current date and time to the content of the element <RefDate> of an XML document. A Java class is used for this extension.

```
<schema-adjunct target="...">
    <document>
        <param-list>BuyerChangeOrderNumber ;
        ChangeOrderIssueDate;RefNumber</param-list>
    </document>
    ......
    <element which = "RefDate ">
        <class>test.xst.templates.InfoRetriever</class>
        <method>getDateTime</method>
    </element>
    ......
</schema-adjunct>
```

In this above example, the content of the element <param-list> specifies a list of leaf elements to be saved in a hashtable object by XST; RefDate corresponds to the name of an element in the source XML document; test.xst.templates.InfoRetriever is the name of the Java class to provide the Schema Adjunct extension; and getDateTime is the name of the method of this class to be called. The <param-list> enables the SA extension to access the elements that have been processed by XST, from the source XML document.

Sample code for the Java class, used to provide the updated information for the element <RefDate>, is shown below.

```
/*
 * File Name: InfoRetriever.java
 */
package test.templates;
import java.util.Hashtable;
import java.util.Date;
import java.util.Properties;
import com.commerceone.xst.utils.PropertyReader;
public class InfoRetriever
{
  private Properties props;
  public InfoRetriever( )
  {
    this.props = PropertyReader.getProperties(PROP_FILE);
  }
  ......
  public String getDateTime(String localName, String value, Hashtable ht, String event)
  {
    return (new Date( )).toString( );
  }
  static private int cnt = 0;
  static private String PROP_FILE = "test/templates/DefaultInfo.prop";
}
```

The method providing the SAF extension may have four arguments, as shown in the above sample code, where localName and value are corresponding to the name and value of an element, under transformation, in the original XML document; ht is the hashtable to store a list of leaf elements specified by the content of the element <param-list> in the SAF document; and event is the name of a SAX event when the method is invoked. It is noted that the arguments passed to this method are not used in the sample code. When lookup is enabled, the above method will be invoked by the XST to provide additional information to the element <RefDate> under transformation.

The following example shows a sample source document, ChangeOrder.xml, with the element <RefDate> in it.

```
<?soxtype urn:x-
commerceone:document:com:commerceone:XCBL35:XCBL35.sox$1.0?>
<ChangeOrder>
  <ChangeOrderHeader>
    <ChangeOrderNumber>
      <BuyerChangeOrderNumber>4500006637</
      BuyerChangeOrderNumber>
    </ChangeOrderNumber>
    <ChangeOrderSequence/>
<ChangeOrderIssueDate>20010521T12:00:00</ChangeOrderIssueDate>
    <OrderReference>
      <Reference>
        <RefNum>4500006637</RefNum>
          <RefDate>20010521T15:27:17</RefDate>
        </Reference>
      </OrderReference>
      <SellerParty>
      ......
  </ChangeOrderHeader>
  ......
</ChangeOrder>
```

With most of the logic in the SAF extension processing, a simple template is used to transform the ChangeOrder element:

```
<xst:templates>
  <xst:pi>NAME=ChangeOrder.tpl;COPY=true</xst:pi>
</xst:template>
```

Using this template with the SAF document and the Java class shown above, and running XST on Sep. 21, 2001 at 15:27:17, the transformed document below results:

```
<?soxtype urn:x-
commerceone:document:com:commerceone:XCBL35:XCBL35.sox$1.0?>
<ChangeOrder>
  <ChangeOrderHeader>
    <ChangeOrderNumber>
   <BuyerChangeOrderNumber>4500006637
   </BuyerChangeOrderNumber>|
   </ChangeOrderNumber>
   <ChangeOrderSequence/>
   <ChangeOrderIssueDate>20010521T12:00:00</ChangeOrderIssueDate>
   <OrderReference>
     <Reference>
       <RefNum>4500006637</RefNum>
       <RefDate>20010921T15:27:17</RefDate>
     </Reference>
   </OrderReference>
   <SellerParty>
   ......
  </ChangeOrderHeader>
  ......
</ChangeOrder>
```

In this transformed document, the element <RefDate> has an updated date/time, provided by the Java SA extension.

The following example illustrates how to use SAF to provide additional information to a field "address1" of an XML document. A Java class is used for this extension.

```
<schema-adjunct target="po.dtd">
  ......
  <element which = "address1">
    <class>test.xst.templates.AddressRetriever</class>
    <method>getAdditionalAddressInfo</method>
    <mode>replace</mode>
  </element>
  ......
</schema-adjunct>
``` where "address1" is the field in the original XML document to be transformed/modified; "test.xst.templates.AddressRetriever" is the name of the Java class; "getAdditionalAddressInfo" is that of the method of this class to be called, and "replace" is the mode of the operation on the returned value. The sample code for the Java class used is shown below.

```
package test.xst.templates;
public class AddressRetriever
{
  public AddressRetriever( ) { }
  public String getNewAddressInfo(String localName, String value, Hashtable params)
  {
    return " The new address is: " + localName + "=" + value;
  }
  public String getAdditionalAddressInfo(String localName, String value, Hashtable params)
  {
    return " !! Additional address info for " + localName + ". The original value is:" + value + ".";
  }
}
```

The signature of the method may have three arguments, "String localName", "String value" and "Hashtable params".where "localName" and "value" are corresponding to the name and value of a field under transformation in the original XML document; and "Hashtable params" is the "hashtable" to store a list of names specified in the schema adjunct document and their available values in the XML document. When lookup is enabled, the above method will be invoked by the XST to provide additional information to an XML document under transformation.

Figure 11:
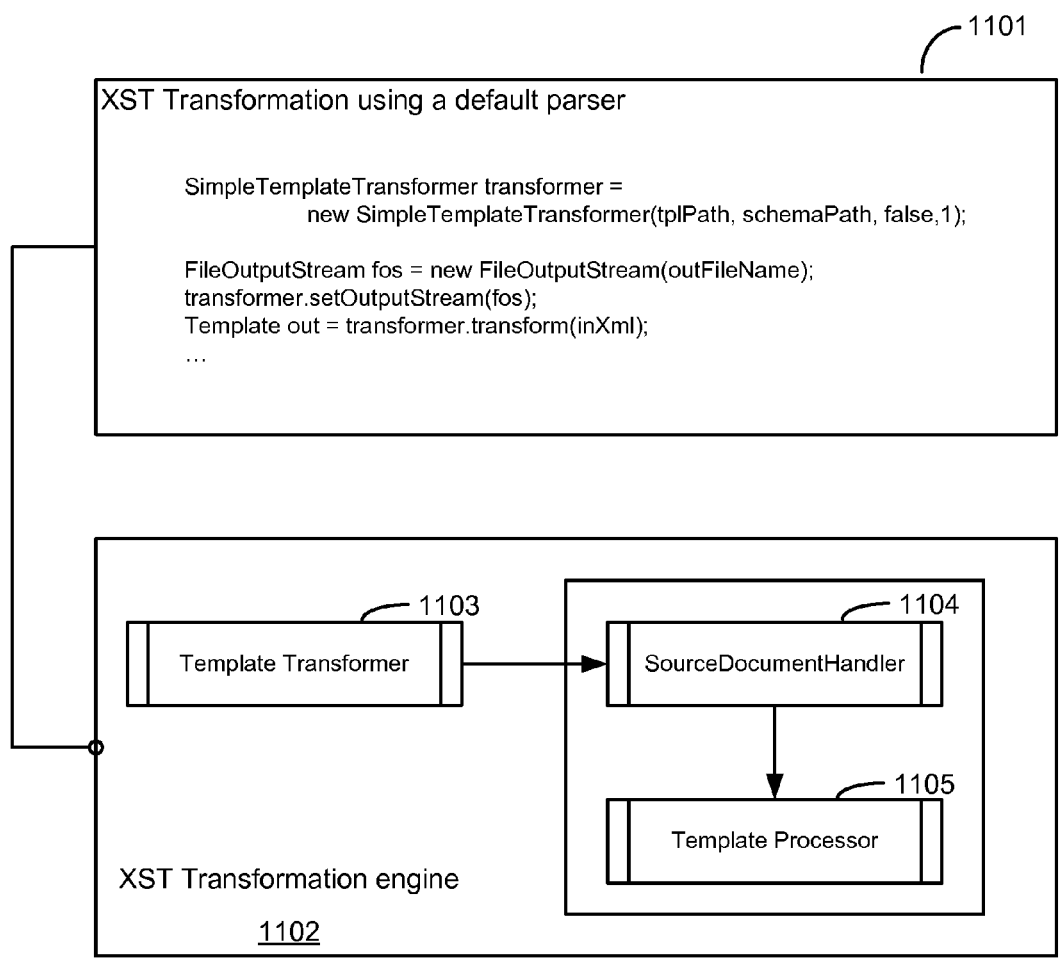
FIGS. 11 and 12 depict alternative implementations, utilizing different SAX parsers.
Figure 12:
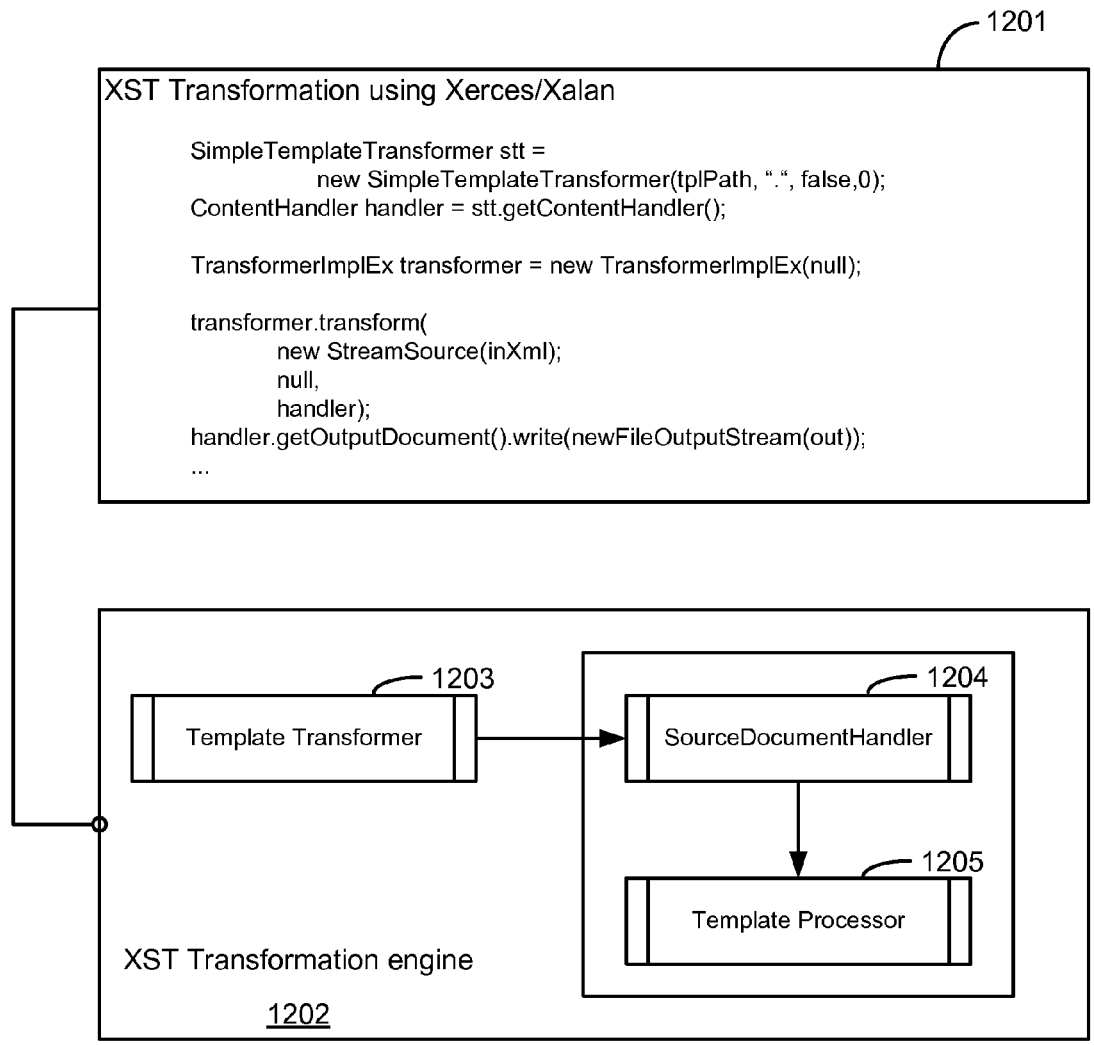

The XST transformation engine provides interfaces to transform an XML document using a default XML parser, such as Xerces, or a user selected parser. The in FIGS. 11 and 12, two alternative parsers are used to generate event streams. The particular parsers illustrated in this environment are XML parsers. The parsers are a default Commerce One XML parser 1101 and an Xerces/Xalan parser 1201. Sample syntax and semantics for invoking these parsers is illustrated. In either case, the output of the parser is input to an XST transformation engine 1102. The XST transformation engine comprises a template transformer 1103, a source document handler 1104, and a template processor 1105. More detail of interaction among these components is illustrated in FIGS. 13 and 14, for a template source and a document source.

In the second embodiment, the high level design supports additional features. XST templates with similar syntax to that of XSLT stylesheet are used. All templates used for a transformation reside in one template source, or are included by reference in the template source. Additional templates can be added through a public interface or API. Fragments or subsections of the source document may be represented by a tree structure that is accessible using of XPath expressions or tree manipulations. The logical operations if, choose, when and otherwise are supported in XST templates. Built-in functions are provided for string, substring, concatenation functionality. A Java extension function handler can be installed to handle user-defined extension functions. The handler supports calling a Java method by specifying both its class path and method name. Variables that accept values from the input stream are mutable during the transformation. In alternative embodiments, features of the first and second embodiments can be mixed and matched.

Figure 13:
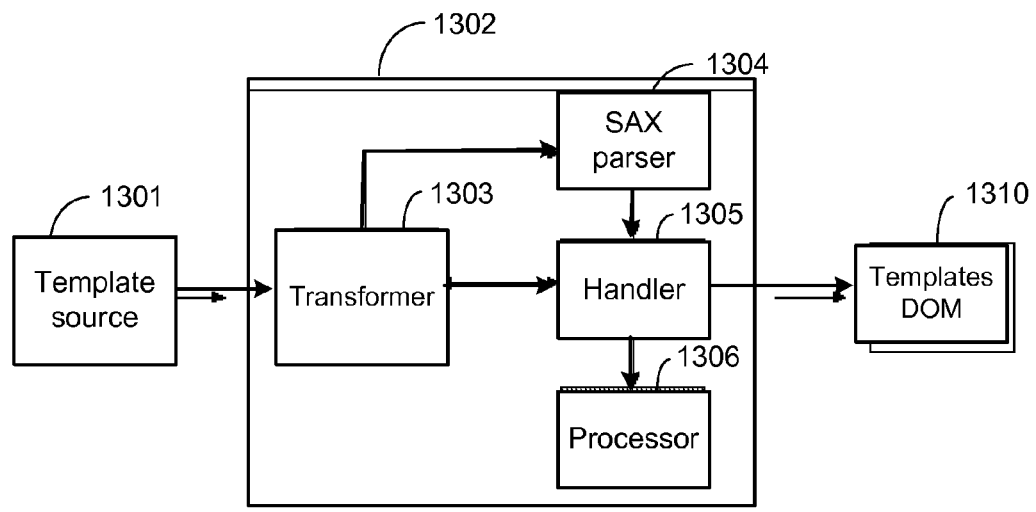
FIG. 13 is a high-level block diagram of template processing.
Figure 14:
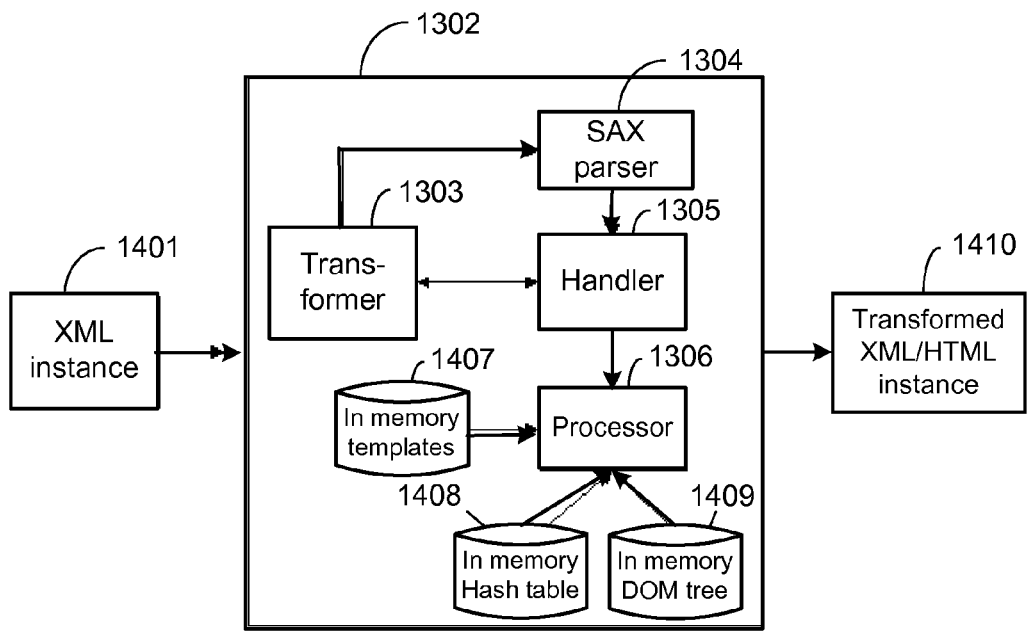
FIG. 14 is a high-level block diagram of XML instance processing, following template processing.

The high-level architecture of the second embodiment resembles the first, as depicted in FIGS. 13-14. FIG. 13 is a diagram showing the process flow to parse the XST template source. FIG. 14 is a diagram showing the process flow to transform an XML instance. In the figures, the transformer module 1303 provides a convenient way to use XST with an XML parser 1304 such as the Commerce One's CXPParser or Xerces parser. It also provides the interfaces to get a new instance of the content handler and a list of templates used. The handler module 1305 provides the content handlers for both the template and source document 1301. Those handlers can be used with any XML parsers, preferably parsers that comply with the W3C standards. The handlers send the SAX parsing events to XST processor 1306 for further processing. The processor module 1306 provides the template processor to process the XST templates 1301 into a tree of DOM elements 1407 and the source document processor to transform the XML instance 1401 using a list of template elements 1408. An XST template 1401 is a valid XML document that provides the rules for a transformation. The template module includes the classes for each of the elements in a template. It also provides the mechanism to stream and clone a template. The module Xpath, not shown in the figures, provides the adapter classes to use and execute XPath expressions implemented by an XPath engine.

Returning to the first embodiment, the public interface to the document handler 1305 provides several method calls. The getOutputDocument method may be declared as: public XSTtemplate getOutputDocument( ). This method returns the current root template used in a transformation. The getOutputStream method may be declared as: public java.io.OutputStream getOutputStream( ). This method returns the target output stream used in this transformation. The getContentHandler method may be declared as: public org.xml.sax.ContentHandler getContentHandler( ). This method returns the ContentHandler of this handler. The getTemplates method may be declared as: public java.util.Hashtable getTemplates( ). This method gets the current template list. The putTemplates method may be declared as: public void putTemplates(java.util.Hashtable templList). This method puts a list of template to the current or active template list. The setOutputStream method may be declared as: public void setOutputStream(java.io.OutputStream os). This method sets the output stream for this transformation. The setSiblingContentHandler method may be declared as: public void setSiblingContentHandler(org.xml.sax.ContentHandler handler). This method puts a sibling handler at the end of the sibling list.

The public interface for DocumentProcessor extends the TemplateProcessor. It also includes several methods. It inherits from a SAX compliant template processor methods including characters, comment, endDocument, endElement, processingInstruction, pushElement, pushTemplate, startDocument, startElement. In addition, the getOutputStream method of the DocumentProcessor interface may be declared as: public java.io.OutputStream getOutputStream( ). This method gets the output stream used by this processor. This object cannot be null for a streaming mode transformation. The getDOMByRootName method may be declared as: public org.w3c.dom.Node getDOMByRootName(java.lang.String name). This method retrieves the DOM object for a given name. The getOutputTemplate method may be declared as: public XSTtemplate getOutputTemplate( ). This method gets the output template which is the root template of this transformation. The getSchemaPath method may be declared as: public java.lang.String getSchemaPath( ). This method gets the schema path for the Schema Adjunct document. The getTemplatePath method may be declared as: public java.lang.String getTemplatePath( ). This method gets the template path. The getTemplates method may be declared as: public java.util.Hashtable getTemplates( ). This method gets the current template list. The getXPathContext method may be declared as: public org.apache.xpath.XPathContext getXPathContext( ). This method gets the XPath running context, which should include the context node in the source document tree. The lookup method may be declared as: public java.lang.String lookup(java.lang.String key, java.lang.String value, java.util.Hashtable ht, java.lang.String method, java.lang.String event, XSTtemplate templ). This method looks up the value for a given node using a specified method. In its parameter list: localName is the name of the context node which is also the name of the first choice; value is the value of the context node; ht is a Hashtable used to store values for the params specified in a template; method is the name of the method used for the lookup; event is a SAX event when this method is called; and templ is the template of the context node. This method returns a value for the given context node. The putTemplates method may be declared as: public void putTemplates(java.util.Hashtable templList). This method adds a list of templates to the current template list. The setOutputStream method may be declared as: public void setOutputStream(java.io.OutputStream os).

This method sets the OutputStream for this processor, for a streaming mode transformation. The setSchemaPath method may be declared as: public void setSchemaPath (java.lang.String path). This method sets the schema path for a Schema Adjunct document. The setTemplatePath method may be declared as: public void setTemplatePath (java.lang.String path). This method sets the template path.

The public interface for TemplateProcessor includes several methods. The getTemplates method may be declared as: public java.util.Hashtable getTemplates( ). This method gets the current template list. The pushElement method may be declared as: public void pushElement(java.lang.Object elem). This method pushes the element to the element stack. The pushTemplate method may be declared as: public void pushTemplate(java.lang.String name, java.lang.Object templ). This method pushes the template to the template stack, when name is the name of the object to be pushed and templ is the object of the template to be pushed. The characters method may be declared as: public void characters(char[ ] ch, int start, int length) throws org.xml.sax.SAXException. This is the SAX event handler interface for characters or input. In its parameter list: ch is a character array containing the value of the current element; start is an index of the first character in the character array for the value of the current element; and length is the number of characters for the value of the current element. The endDocument method may be declared as: public void endDocument( ) throws org.xml.sax.SAXException. This is the SAX event handler interface for endDocument. The endElement method may be declared as: public void endElement(java.lang.String namespace, java.lang.String localName, java.lang.String rawName), throws org.xml.sax.SAXException. This is the SAX event handler interface for endElement. In its parameter list: localName is the node name of the current element without prefix; and rawName is the qualified name of the current element (with prefix).

The startDocument method may be declared as: public void startDocument( ) throws org.xml.sax.SAXException. This is the SAX event handler interface for startDocument. The startElement method may be declared as: public void startElement(java.lang.String namespace, java.lang.String localName, java.lang.String rawName, org.xml.sax.Attributes atts) throws org.xml.sax.SAXException, javax.xml.transform.TransformerException, javalo.IOException. SAX event handler interface: startElement. In its parameter list: namespace is the namespace of the current element; localName is the local part of the qualified name of the current element (without prefix); rawName is the qualified name of the current element (with prefix); and attributes is a list of the attributes associated with the current element. The processingInstruction method may be declared as: public void processingInstruction(java.lang.String target, java.lang.String data) throws org.xml.sax.SAXException. This is the SAX event handler interface for processingInstruction. In its parameter list: target is the processing instruction target; and data is the processing instruction data, or null if none is supplied. The method throws an org.xml.sax.SAXException, which any can be SAX exception, possibly wrapping another exception. Comments are supported.

The public interface XSTElement supports elements of the XST transformation language. The details of this interface vary between the first and second embodiments. The first embodiment includes several methods. The appendChild method may be declared as: public void appendChild(XSTElement elem). This method appends a child element to this element. The appendAndPushChild method may be declared as: public void appendAndPushChild(XSTElement elem). This method appends a child element to this element and push it to the element stack of its processor. The appendContent method may be declared as: public void appendContent(java.lang.String content). This method appends the content of String to the content of this element. The appendContent method may be declared as: public void appendContent(java.lang.Object content). This method appends the content of an Object to the content of this element. The attachChild method may be declared as: public void attachChild(XSTElement elem). This method attaches a child element to this element even though it may not be a direct child. The clone method may be declared as: public java.lang.Object clone( ). This method clones this element and returns a copy. The cloneAll method may be declared as: public XSTElement cloneAll( ). This method clones this element including all of its children. The execute method may be declared as: public java.lang.Object execute( ). This is an entry point to the element transformation. It returns the result of the element transformation. The execute method may be declared as: public void execute(java.io.OutputStream os) throws java.io.IOException. This method executes the transformation of this element and sends the result to the OutputStream. The getAttribute method may be declared as: public java.lang.String getAttribute(javalang.String qname). This method retrieves the content of an attribute for the given name. The getChild method may be declared as: public XSTElement getChild( ). This method gets the first child of this element. The getContent method may be declared as: public java.lang.Object getContent( ). This method gets the content of this element. The getElementName method may be declared as: public java.lang.String getElementName( ). This method gets the name attribute of this element. The getName method may be declared as: public java.lang.String getName( ). This method gets the name of this element. The getNamespace method may be declared as: public java.lang.String getNamespace( ). This method gets the namespace of this element. The getParent method may be declared as: public java.lang.Object getParent( ). This method gets the parent element of this element. The getSibling method may be declared as: public XSTElement getSibling( ). This method gets a sibling element of this element. The setProcessor method may be declared as: public void setProcessor(TemplateProcessor processor). This method sets the processor to process the template of this element. The setParent method may be declared as: public void setParent(java.lang.Object parent). This method sets the parent element of this element. The setSibling method may be declared as: public void setSibling(XSTElement elem). This method sets the sibling element of this element.

The public interface of XSTtemplate further handles elements of the XST processing language. This public interface includes several methods. The getParentTemplate method may be declared as: public XSTtemplate getParentTemplate( ). This method gets the parent template of this template. The getID method may be declared as: public int getID( ). This method gets the ID of this template. The getDOM method may be declared as: public org.w3c.dom.Node getDOM( ). This method gets the DOM object of this template. The getOccurrences method may be declared as: public int getOccurrences( ). This method gets the number of usages of this template. The getMaxOccurrences method may be declared as: public int getMaxOccurrences( ). This method gets the allowed maximum number of usages of this template. The isVariable method may be declared as: public boolean isVariable(java.lang.String name). This method checks if the template has a variable for the given name. It returns a flag to indicate if the template has a variable for the given name. The setParentTemplate method may be declared as: public void setParentTemplate(XSTtemplate templ). This method sets the parent template of this template. The setVariable method may be declared as: public boolean setVariable (java.lang.String name, java.lang.Object value). This method sets the content of a variable in this template. The setVariable method may be declared as: public boolean setVariable (java.lang.String name, java.lang.Object value, boolean check). This method sets the content of a variable in this template. In its parameter list: name is the name of the variable; value is the content of the variable to be set; and check is a flag to indicate that the content of the variable should be checked first. The write method may be declared as: public void write(java.io.OutputStream os) throws java.io.IO exception. This method writes the content of the transformation of this template to the OutputStream.

The template used in the first embodiment efficiently transforms documents with simple rules. However, it relies on Schema Adjunct Framework to support logical operations and invoke Java extension functions, which degrades performance and increases the complexity in the template creation.

The second embodiment uses some of the familiar XSLT syntax in the templates. It builds the support of logical operations and Java extensions into the template language. This feature enables XST to perform complex transformations. A template using the XSLT style syntax of the second embodiment, is shown below.

```
<xst:template name="Root" >
<Root>
  Beginning of the template for Root
  <Boing><xst:var name="Boing"/></Boing>
  <Node2><xst:var name="Node2"/></Node2>
  End of the template for Root
</Root>
</xst:template>
```

In this sample, an attribute "name" is used to specify the name of the template. Both "Boing" and "Node2" are local variables and their content will be sent to the transformed document automatically. A template can have both global and local variables. The content of a local variable may be sent to the output document automatically.

In the following template, "myVar" is a global variable. It can be referenced in the following content of the template. Element "Node22" is a local variable. Its value is the content of the global variable "myVar".

```
<xst:templates name="SimpleTransform"
xmlns:xst="http://www.commerceone.com/XST" version="1.0">
<xst:template name="Root" dom="Root" skip="Node3|Node4">
<xst:var name="myVar" select="Node2"/>
<Root>
  Beginning of the template for Root
  <Boing><xst:var name="Boing"/></Boing>
  <Node2><xst:var name="Node2"/></Node2>
  <Node22><xst:var name="Node22" select="$myVar"/></Node22>
  End of the template for Root
</Root>
</xst:template>
<xst:template name="Node1" dom="Node1">
  <Node1><xst:var name="Node1"/></Node1>
</xst:template>
</xst:templates>
```

A single template source is used for all the templates used in a transformation. A template source should start with the element <xst:templates>. The name of the source in the sample above is "SimpleTransform". There are two templates, i.e. Root and Node1, in the source above. Once loaded, all the templates in the template source will be saved in memory for fast access. Interfaces will be provided to pass in additional templates during a transformation.

A DOM can be created for a fragment or part of the source document during the streaming of the source by specifying the root node of the DOM in the attributes of a template. XPath expressions or tree manipulations can then be used to access the DOM.

```
<xst:template name="OrderParty" domsrc="OrderContact"
dom="OrderContact">
......
<OrderContactName>
  <xst:var name="ContactName" select="//ContactName"/>
</OrderContactName>
......
</xst:template>
```

In the above example, attribute "domsrc" defines the root node for the DOM source in the input document. This attribute will be used as the name of the created DOM for other templates to access it. Attribute "dom" specifies the name of the DOM to be used in this template. Once created, a DOM is accessible to all templates used in a transformation.

The following is another template that reuses the DOM created by the template in the previous example.

```
<xst:template name="ShippingParty" dom="OrderContact">
......
<OrderContactName>
  <xst:var name="ContactName" select="//ContactName"/>
</OrderContactName>
......
</xst:template>
```

Logical operations "if" and "choose" are supported in the second embodiment.

```
<xst:if test="ContactName">
<OrderContactName><xst:var name="ContactName"/>
</OrderContactName>
</xst:if>
```

In this example, the test is on a leaf node "ContactName". If a test is not on a leaf node, a valid XPath expression must be used and the context nodes/DOM for the XPath should be available.

```
<xst:template name="ShippingParty" dom="OrderContact">
......
<xst:if test="//OrderContact/Contact">
<OrderContactName>
  <xst:var name="ContactName"
select="//OrderContact/Contact/ContactName"/>
</OrderContactName>
</xst:if>
......
</xst:template>
```

Logical operation <choose> is also supported. Element <choose> has child elements <when> and <otherwise>.

```
<xsl:choose>
<xsl:when test="UOMCodedOther">
```

```
<UOMCoded><xst:var name=" UOMCodedOther "/></UOMCoded>
</xsl:when>
<xsl:otherwise>
    <UOMCoded><xst:var name=" UOMCoded"/></UOMCoded>
    </xsl:otherwise>
</xsl:choose>
```

Element <choose> can have multiple child elements <otherwise> to support multiple options.

```
<xsl:choose>
<xsl:when test="UOMCodedOther">
<UOMCoded><xst:var name=" UOMCodedOther "/></UOMCoded>
</xsl:when>
<xsl:otherwise test=" UOMCoded ">
<UOMCoded><xst:var name=" UOMCoded"/></UOMCoded>
</xsl:otherwise>
<xsl:otherwise>
<UOMCoded>No UOMCoded Info</UOMCoded>
</xsl:otherwise>
</xsl:choose>
```

Only the last child element <otherwise> does not have the attribute "test".

The following built-in functions are supported in the second embodiment. A function string:

```
<xst:var name="StreetAddress" select="string('19191 Valco Parkway')"/>
<xst:var name="City" select="string('Cupertino')"/>
```

A function concat:

```
<xst:var name="Address" select="concat($StreetAddress, ', ')"/>
<xst:var name="Address" select="concat($StreetAddress, $City)"/>
```

A function string-length:
   <xst:var name="Length" select="string-length($StreetAddress)"/>
A function sub-string:
   <xst:var name="StreetAddress" select="sub-string($Address, 0, 19)"/>

In the above template, given the variable $Address="19191 Valco Parkway, Cupertino", the return from the function sub-string(..) is "19191 Valco Parkway" for the variable "StreetAddress". Additional built-in functions, that are supported by XSLT, such as addition (+), subtraction (−), multiplication (*), division (div), etc., may also be supported.

Java extension functions can be used just like the built-in functions with the namespace/prefix "java".

```
<xst:template name="OrderInfo"
xmlns:java=http://www.commerceone.com/xst/java>
......
<xst:var name="OrderDate" select="string('20011012T17:56:20')"/>
<xst:var name="Date" select
="test.extensions.DateInfo:getXCBLDate($OrderDate)"/>
......
</xst:template>
```

The number of arguments used in the template to call a Java extension function should match the number of arguments of that Java extension function.

Different from XSLT, both global and local variables can be modified during the transformation. The following is a sample of modifying global variables during the transformation.

```
<!-- Global variables using built-in functions -->
<xst:var name="gVar1" select="string('This is a global variable')"/>
<xst:var name="gVar2" select="string-length('This is a global variable')"/>
<Root>
Beginning of the template for Root
<!-- Modify global variables -->
<ModifiedGlobalVariable>
    <xst:var name="gVar1" select="concat($gVar1, '-modified')"/>
</ModifiedGlobalVariable>
<ModifiedGlobalVariable>
    <xst:var name="gVar2" select="number($gVar2+100.50)"/>
</ModifiedGlobalVariable>
<!-- Modify again the global variable -->
<AgainModifiedGlobalVariable>
<xst:var name="gVar1" select="concat($gVar1, '-again')"/>
</AgainModifiedGlobalVariable>
```

The schema for each of the XST elements can be found in FIG. 15A-C. In FIG. 15A-C, the value (required or optional) of attribute use for the attributes of an element can be determined.

The XML element templates is the root element of a template source document. It can have as its children comment, include, or template, as shown in the discussion above of variables, and as shown below.

```
<xst:templates name="binding"
xmlns:xst="http://www.commerceone.com/XST"
version="1.0">
<xst:comment>This is a sample templates</xst:comment>
<!--First template -->
<xst:template name="Root">
<Root>
<Boing>
<xst:bind-template name="Node1"/>
</Boing>
<Node2><xst:var name="Node2" select="Node2"/><xst:val-of
select="$Node2"/></Node2>
</Root>
</xst:template>
<!--Second template -->
<xst:template name="Node1">
<Node1><xst:val-of select="param(Node1)"/></Node1>
</xst:template>
</xst:templates>
```

In this sample, the element val-of is used for the content of <Node1> while elements var and val-of are used for that of element <Node2>. Those usages will be discussed below.

The element template provides the rules for a transformation within the scope/life-time of the template. It also provides the layout for the target/transformed document. A template is activated or loaded at the SAX event of startElement for the element it matches in the source XML document and will be unloaded at the SAX event of endElement for the same element. XST tries to send the transformed content of a template at the event of endElement if possible. The syntax of the template element is:

```
<xst:template
    match="element name to match"
    namespace="namespace to match"
    copy="true|false"
    deferred="true|false"
```

-continued

```
        inclusive="true|false"
        alias="name only used when attribute copy is ture and inclusive is
        false"
        domsrc="name of the root element for the dom"
        skip="list of elements to be skiped"
        param="list of elements to be saved"
        friend="id(reserved for future use) "
>
        ...
</xst:template>
```

In this syntax, match is the ID/name of the element in the source document to match for which the template will be loaded/unloaded at the SAX event of startElement/endElement. Namespace is the namespace to match for the element. The default value is null. Copy is a flag to specify whether the default behavior is to copy the source to the target document. The default value is false. Deferred is a flag to specify whether to defer the output of the content of the template until the content of its parent template is output. The default is false. Inclusive is a lag to specify whether to copy the name of the root element to the target document when copy=true. The default value is true. Alias is a replacement for the name of the root element copied to the target document when copy=true and inclusive=false. The default value is null. Domsrc is the name of the element in the source document for which a DOM is to be created within the scope of this template using it as the root (element). DOM is always created as a global object and accessible to all templates. The default value is null. Skip includes a list of names separated by "|" for the elements to be skipped during the transformation. The default value is null. Param is a list of names separated by "|" for the elements to be saved for later use during the transformation. The default value is null. Friend is an alias of the name of the element in the source document to match. The default value is null.

Since the activation or loading and deactivation or unloading of a template are triggered by the SAX events, a parent template can be used to defer the execution/output of its child templates to the time to output that of the parent. This is to insure that the needed information is available before the execution of its child templates during streaming of the source document.

Again, the element val-of is used to send the selected content to the target document.

```
        <xst:val-of
            select="select expression"
            dom="dom id"
            disable-output-escaping="yes|false"
        </xst:value-of>
```

Element val-of can be initialized using a valid XPath expression.

The following expressions can be used as the value of the attribute select. Param refers to a parameter that is local to a template. For example: <xst:val-of select="param(CountryCode)"/>. Variable is a mutable variable. For example: <xst:val-of select="$v"/>. Built-in functions include those XST built-in functions described above. For example: <xst:val-of select="string('my variable')"/>. Java extension is a Java extension function. It must include the class path and method name separated by ":." For example: <xst:val-of select="com.commerceone.xst.test.InfoRetriver:getDateTime($v0, 2000)"/>. XPath/DOM is a valid Xpath expression with a DOM. For example: <xst:val-of select="//ListOfItemDetail/ItemDetail" dom="ListOfItemDetail"/>. The attribute dom is used to specify a DOM source for the select/XPath expression.

Attribute disable-output-escaping is used to disable the escaping of the following characters, <, > and &. The default is to escape those characters as < > and & respectively.

The element var is used to define/declare a variable in XST. Variables are mutable in XST. A variable can be either global or local to a template. All variables which are direct children of a template are global ones and accessible to all templates.

```
        <xst:var
            name="id"
            select="select expression"
            dom="dom id"
        </xst:var>
```

Element var can be initialized using a valid XPath expression. Attribute dom can be used to specify a DOM as the source for the select/XPath expression. The same set of expressions as for element val-of can be used for element var.

The following code excerpt illustrates the expressions set out above.

```
<xst:templates name="variables"
xmlns:xst="http://www.commerceone.com/XST" version="1.0">
<xst:template name="Root">
<!-- Global variables using built-in functions -->
<xst:var name="gVar1" select="string('This is a global variable')"/>
<xst:var name="gVar2" select="string-length('This is a global variable')"/>
<Root>
<!-- Use global variables -->
<UseGlobalVariable><xst:val-of select="$gVar1"/></UseGlobalVariable>
<UseGlobalVariable><xst:val-of select="$gVar2"/></UseGlobalVariable>
<!-- Modify global variables using built-in functions -->
<ModifiedGlobalVariable>
<xst:var name="gVar1" select="concat($gVar1, '-modified')"/>
<xst:val-of select="$gVar1"/>
</ModifiedGlobalVariable>
<ModifiedGlobalVariable>
<xst:var name="gVar2" select="number($gVar2 + 100.50)"/>
<xst:val-of select="$gVar2"/>
</ModifiedGlobalVariable>
<!-- Modify again global variables -->
<AgainModifiedGlobalVariable>
<xst:var name="gVar1" select="concat($gVar1, '-again')"/>
<xst:val-of select="$gVar1"/>
</AgainModifiedGlobalVariable>
<ValOfNode2><xst:val-of select="param(Node2)"/></ValOfNode2>
<!--Use a param -->
<Node1><xst:val-of select="param(Node1)"/></Node1>
<Node2><xst:var name="Node2" select="Node2"/><xst:val-of
select="$Node2"/></Node2>
<UseLocalVariable><xst:val-of
select="concat('',$Node2,'')"/></UseLocalVariable>
</Root>
</xst:template>
</xst:templates>
```

In several examples that follow, the following XML source input is used:

```
<Root>
    <Boing>
        <Node1 bingo = "dingo">This is Node 1</Node1>
    </Boing>
    <Node2>This is Node 2</Node2>
</Root>
```

This XML source input transformed using the preceding templates produces the following output:

```
<Root>
<UseGlobalVariable>This is a global variable</UseGlobalVariable>
<UseGlobalVariable>25</UseGlobalVariable>
<ModifiedGlobalVariable>This is a global variable-
modified</ModifiedGlobalVariable>
<ModifiedGlobalVariable>125.5</ModifiedGlobalVariable>
<AgainModifiedGlobalVariable>This is a global variable-modified-
again</AgainModifiedGlobalVariable>
<ValOfNode2>This is Node 2</ValOfNode2>
<Node1>This is Node 1</Node1>
<Node2>This is Node 2</Node2>
<UseLocalVariable>This is Node 2</UseLocalVariable>
</Root>
```

The following is a sample template using a DOM attribute:

```
<xst:templates name="doms-2"
xmlns:xst="http://www.commerceone.com/XST"
version="1.0">
<xst:template name="Root">
<!--Bind template Node1 for DOM creation -->
<xst:bind-template name="Node1"/>
<Root>
<!-- DOM/XPath. The DOM is created in template Node1 -->
<Node1><xst:val-of select="//Node1[@bingo='dingo-1.1']"
dom="node1"/></Node1>
<Node1-attribute><xst:val-of select="//@bingo"/ dom="node1"></Node1-
attribute>
<Node1-attribute><xst:val-of select="//@bingo='dingo-1'"
dom="node1"/></Node1-attribute>
</Root>
</xst:template>
<!--Template used only to create the DOM -->
<xst:templatename="Node1" copy="false" domsrc="Node1"/>
</xst:templates>
```

The DOM used in template Root above is created in the following template Node1. The output document using this template and the source document above is:

```
<Root>
<Node1>This is Node 1.1</Node1>
<Node1-attribute>dingo-1.1</Node1-attribute>
<Node1-attribute>false</Node1-attribute>
</Root>
```

Element bind-template is used to activate or bind a template when the value of the template attribute match matches the name of an element in the source document. This is only necessary when the template attribute copy is false. When copy is true, a template can bind/load any templates within its scope as long as the child template can match an element in the source document. The syntax for matching and activating a template is <xst:bind-template name="id"/>.

The following template:

```
<xst:templates name="bindings"
xmlns:xst="http://www.commerceone.com/XST" version="1.0">
<xst:template match="Root">
Beginning of the template for Root
<Root>
<Boing>
<!-- Bind/load template Node1 -->
<xst:bind-template name="Node1"/>
</Boing>
<Node2><xst:val-of select="param(Node2)"/></Node2>
</Root>
```

End of the template for Root
```
</xst:template>
<xst:template name="Node1">
Beginning of the template for Node1
<xst:var name="Node1" select="Node1"/>
<Node1><xst:val-of select="$Node1"/></Node1>
End of the template for Node1
</xst:template>
</xst:templates>
``` applied to the source input above, produces the following output:

```
Beginning of template for Root
<Root>
<Boing>
Beginning of template for Node1
<Node1>This is Node 1</Node1>End of template for Node1
</Boing>
<Node2>This is Node 2</Node2>
</Root>
End of the template for Root
```

Element attribute is used to add/append an attribute to a user defined element. Its syntax is:

```
<xst:attribute
    name="id"
    select="select expression"
</xst:attribute>
```

Like elements val-of and var, the select expression is a valid XPath expression.

The following templates:

```
<xst:templates name="attributes"
xmlns:xst="http://www.commerceone.com/XST" version="1.0">
<xst:template name="Root">
<xst:var name="Node2" select="Node2"/>
<Root>
<Node2>
<!-- Attribute using a variable -->
<xst:attribute name="attr1" select="$Node2"/>
<!-- Attribute using a built-in function -->
<xst:attribute name="attr2" select="string('my attribute 2')"/>
<!-- Attribute using a param -->
<xst:attribute name="attr3" select="param(Node2)"/>
<xst:val-of select="param(Node2)"/>
</Node2>
</Root>
</xst:template>
</xst:templates>
``` when applied to the source input above, produces the following output:

```
<Root>
<Node2 attr1="This is Node 2" attr2="my attribute 2"
attr3="This is Node 2">
This is Node 2
</Node2>
</Root>
```

Elements if, choose, when and otherwise are used to provide logical operations in XST. A valid XPath expression can be used for the "test expression", i.e. the value of the attribute test. Their syntax is:

```
<xst:if test="test expression">
    ...
</xst:if>
...
...
<xst:choose>
    <xst:when test="test expression">
        ...
    </xst:when>
    <xst:otherwise test="test expression">
        ...
    </xst:otherwise>
    <xst:otherwise test="test expression">
        ...
    </xst:otherwise>
    ...
    <!--The last otherwise in the logical construct should not have a test expression -->
    <xst:otherwise>
        ...
    </xst:otherwise>
</xst:choose>
```

The following template:

```
<xst:templates name="logical-operators"
xmlns:xst="http://www.commerceone.com/XST" version="1.0">
<xst:template name="Root">
<Root>
<xst:var name="Node2" select="Node2"/>
<Node2><xst:val-of select="$Node2"/></Node2>
<xst:if test="$Node2='This is Node 2'">
    <ResultOfLogicalOperations>Node2="This is Node 2"</ResultOfLogicalOperations>
</xst:if>
<xst:if test="$Node2">
    <ResultOfLogicalOperations>Has a variable - $Node2</ResultOfLogicalOperations>
</xst:if>
<xst:if test="not($Node2)">
    <ResultOfLogicalOperations>Does not has a variable - $Node2</ResultOfLogicalOperations>
</xst:if>
<xst:choose>
    <xst:when test="$Node2='This is Node 1'">
    <Out>This is Node 1</Out>
    </xst:when>
    <xst:otherwise test="$Node2='This is Node 2'">
    <Out>This is Node 2</Out>
    </xst:otherwise>
    <xst:otherwise test="$Node2='This is Node 3'">
    <Out>This is Node 3</Out>
    </xst:otherwise>
    <xst:otherwise>
    <Out>This is Node x</Out>
    </xst:otherwise>
</xst:choose>
</Root>
</xst:template>
</xst:templates>
``` applied to the source input above, produces the following output:

```
<Root>
<Node2>This is Node 2</Node2>
<ResultOfLogicalOperations>Node2="This is Node 2"</ResultOfLogicalOperations>
<ResultOfLogicalOperations>Has a variable - $Node2</ResultOfLogicalOperations>
<Out>This is Node 2</Out>
</Root>
```

Element comment is used to add comments to the target document. It can be the child of any template elements. Its syntax is:

```
<xst:comment>
    content of the comments
</xst:comment>
```

Element fall-back is used to provide the opportunity for an application to handle the error events or the debug information when an action fails for the template elements bind-template, load-template, and redirect.

The following template illustrates the syntax of fall-back.

```
<xst:template ...>
...
<xst:load-template name="$templateName">
    <xst:fall-back>
        <xst:message>Fail to load template <xst:value-of select="$templateName"/></xst:message>
    </xst:fall-back>
...
</xst:template>
```

If the specified template can't be loaded, the message will be sent to either the ErrorHandler provided by the application or to the target document.

Element for-each is used to loop through a set of nodes in a DOM or other tree structure created for a fragment or subsection of the input document. Its syntax is:

```
<xst:for-each select="select expression" dom="id">
    ....
</xst:for-each>
```

The following template:

```
<xst:templates name="for-each"
xmlns:xst="http://www.w3.org/1999/XSL/Transform" version="1.0">
<xst:template name="OrderDetail" domsrc="ListOfItemDetail">
<OrderDetail>
<xst:for-each select="//ListOfItemDetail/ItemDetail" dom="ListOfItemDetail">
    <BuyerLineItemNum><xst:val-of select="local-name( )"/>-<xst:val-of select="."/></BuyerLineItemNum>
</xst:for-each>
</OrderDetail>
</xst:template>
</xst:templates>
``` when applied to the following source input:

```
<Order>
<OrderDetail>
<ListOfItemDetail>
<ItemDetail>
<BuyerLineItemNum>8001</BuyerLineItemNum>
</ItemDetail>
<ItemDetail>
<BuyerLineItemNum>8002</BuyerLineItemNum>
</ItemDetail>
</ListOfItemDetail>
</OrderDetail>
</Order>
``` produces the following output:

```
<OrderDetail>
  <BuyerLineItemNum>ItemDetail-8001</BuyerLineItemNum>
  <BuyerLineItemNum>ItemDetail-8002</BuyerLineItemNum>
</OrderDetail>
```

Element include is used to include additional templates stored in a template source. A URIResolver provided by the application is used to resolve the uri for the included source. Its syntax is, <xst:include href="uri"/>.

Element load-template is used to activate or load a template, in memory, dynamically as the content of the template under execution is being output. The loading template can pass parameters to the template loaded. Those parameters need not be declared in the template loaded. The loaded template can access the runtime context of the loading template which includes the local variables and params. Its syntax is:

```
<xst:load-template name="template id">
  <xst:with-parm name="id1" select="select expression/>
  <xst:with-parm name="id2" select="select expression/>
  ...
</xst:load>
```

The following sample "templates" includes a pair of "template" elements, according to the second embodiment:

```
<xst:templates name="loading"
xmlns:xst="http://www.commerceone.com/XST"
version="1.0">
<xst:template name="Root">
<xst:var name="Node1" select="Node1"/>
<Root>
<Node1>
<xst:load-template name="loaded"/>
<xst:with-param name="message" select="string('This is the output from a loaded tempate: Node1 is not null.')"/>
</Node1>
</Root>
</xst:template>
<xst:template name="loaded">
<xst:if test="$Node1">
<xst:value-of select="$message"/>
</xst:if>
</xst:templates>
```

In the above sample, template "loaded" is loaded by template "root". The equivalent template after the loading is shown below.

```
<xst:templates name="loading"
xmlns:xst="http://www.commerceone.com/XST"
version="1.0">
<xst:template name="Root">
<xst:var name="Node1" select="Node1"/>
<Root>
<Node1>
<xst:if test="$Node1">
<xst:value-of select="string('This is the output from a loaded template: Node1 is not null.')"/>
</xst:if>
</Root>
</xst:template>
</xst:templates>
```

Element message is used to for customized messages. Its syntax is, <xst:message>content of the message</xst:message>

Element redirect is used to redirect a part of the output to a specified target. Its syntax is:

```
<xst:redirect eref="id">
<!-Content to be redirected -->
</xst:redirect>
```

The following is a sample templates using redirect:

```
<xst:templates name="redirect"
xmlns:xst="http://www.w3.org/1999/XSL/Transform" version="1.0">
<xst:template name="ChangeOrderHeader">
...
<xst:redirect eref="http://www.commerceone.com/sql/db_id">
<ChangeType>
  <ChangeTypeCoded><xst:val-of
select=param(AddAdditionalItems)"/></ChangeTypeCoded>
</ChangeType>
</xst:redirect>
...
</xst:template>
</xst:templates>
```

A valid XPath expression can be used for the value of the attribute eref.

```
<xst:templates name="redirect"
xmlns:xst="http://www.w3.org/1999/XSL/Transform" version="1.0">
<xst:template name="ChangeOrderHeader">
<xst:var name="db_id" select="param(refNum)"/>
...
<xst:redirect
eref="concat(string('http://www.commerceone.com/sql/db_id'),
$db_id)">
<ChangeType>
  <ChangeTypeCoded><xst:val-of
select=param(AddAdditionalItems)"/></ChangeTypeCoded>
</ChangeType>
</xst:redirect>
...
</xst:template>
</xst:templates>
```

The entity reference eref should be resolved by the URIResolver provided by the application and the return should be an object of com.commerceone.xst.swijaxp.ResultManager which can manage/close the opened Result object for the "redirect".

In some embodiments, both streaming and buffered modes of transformation are supported. In a streaming mode transformation, the root template is in copy-mode. XST streams out small buffers of transformed content as data for output becomes available. Before loading or activating a child template, the parent template streams out the transformed content of itself to clear the path for the streaming of its child templates. Before unloading or deactivating a template, the template streams out the transformed content of itself to clear the path for the streaming of its siblings. In a buffered mode transformation, the root template is not in copy-mode. XST does not stream out the transformed content. It appends the transformed content of a template, before unloading it, to its parent if the parent is in a copy-mode.

A deferred-mode template is used when the needed information for a transformation is not available for the time being. It provides buffering for less than a whole transformation. Deferred-mode suspends the default behavior of streaming during processing of a template. A deferred-mode template registers with its parent template instead of streaming out its content. Deferred-mode has no effect in a buffered transformation since the entire transformation is, in effect, deferred. One embodiment of template rules allows a template to have only one registered child template to be deferred. Other embodiments may support an arbitrary number of registered child templates to be deferred. In the one embodiment, a parent template streams out any transformed content of a previously registered child template, if there is one, and its own content before it registers a new child template.

In the first embodiment, streaming on demand can be implemented with dummy templates. Streaming of the transformed content of a template is done at the SAX event of either startElement or endElement. By adding dummy templates, we can introduce additional SAX events to reduce the transformed content in memory which will result in increased speed of transformation.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for computer-assisted processing, systems including logic to carry out transform processing, media impressed with logic to carry out transform processing, data streams impressed with logic to carry out transform processing, or computer-accessible transform processing services. It is contemplated that modifications and combinations will readily occur to those skilled in the art, which modifications and combinations will be within the spirit of the invention and the scope of the following claims.

We claim as follows:

1. A computer-implemented method of transforming a document, including:
    using a processor, responding to an element start-event in an event data stream by matching an element name for the element start-event to a template name and activating a matching-name template and, lacking a match, by treating the element between the element start-event and an element end-event as content of a parent element;
    responding to the element end-event paired to the start-event using the template that was activated, including:
        responsive to instructions in the matching-name template, outputting at least some of literal text or input events received in the event data stream between the start-event and the end-event;
        clearing the input events received in the event data stream between the start-event and the end-event; and
        deactivating the matching named template.

2. The method of claim 1, wherein the event data stream represents an electronic commerce document.

3. The method of claim 1, wherein the event data stream represents a document including character data encoding text characters and markup data identifying sets of storage units according to a logical structure of the document.

4. The method of claim 3, wherein a plurality of the templates are stored together in a templates source.

5. The method of claim 1, wherein responding to the element start-event further includes activating one or more variables with a variable scope corresponding to the template and responding to a paired element end-event further includes deactivating the variables.

6. The method of claim 5, wherein responding to the element end-event corresponding to the template further includes processing logic instructions to manipulate the variables.

7. The method of claim 1, wherein responding to the element start-event further includes, in response to an instruction associated with the template, creating a tree representation limited to the element and sub-elements within a scope of template.

8. The method of claim 1, further including receiving in the event stream one or more mutable variables that can be changed using logical, string or arithmetic operations.

9. A computer-implemented method of transforming a document, including:
    using a processor, responding to an element start-event in an event data stream by matching an element name for the element start-event to a template name and activating a first matching-name template and, lacking a match, by treating the element between the element start-event and an element end-event as content of a parent element;
    responding to a nested element start-event in the event data stream by matching an element name for the nested element to a second template name and activating the second matching-name template;
    responding to additional events in the event data stream according to instructions in a most recently activated matching-name template;
    responding to the element end-event paired to the nested element start-event by processing the second matching-name template, including
        responsive to instructions in the matching-name template, outputting at least some of literal text or input events received in the event data stream between the nested start-event and the end-event;
        clearing the input events received in the event data stream between the nested start-event and the end-event; and
        deactivating the second matching-name template.

10. The method of claim 9, further including, responsive the nested element-start event, activating variables in a scope of the second matching-name template, wherein the instructions in a recent second matching-name template include assigning input to one or more of the variables.

11. The method of claim 9, wherein the events in the stream correspond to an electronic commerce document including character data encoding text characters and markup data identifying sets of storage units according to a logical structure of the electronic commerce document.

12. The method of claim 10, wherein a plurality of the templates are stored together in a templates source.

13. The method of claim 9, wherein responding to the nested element start-event further includes, in response to an instruction associated with the template, creating a tree representation limited to the element and sub-elements within a scope of the second matching-name template.

14. The method of claim 9, further including receiving in the event stream one or more mutable variables that can be changed using logical, string or arithmetic operations.

15. A non-transitory computer memory media, including computer program instructions that direct a processor to:
    respond to an element start-event in an event data stream by matching an element name for the element start-event to a template name and activating a matching-name template and, lacking a match, by treating the element between the element start-event and an element end-event as content of a parent element;
    respond to the element end-event paired to the start-event using the template that was activated, including:
        responsive to instructions in the matching-name template, outputting at least some of literal text or input events received in the event data stream between the start-event and the end-event;

clearing the input events received in the event data stream between the start-event and the end-event; and
deactivate the matching named template.

16. The computer memory media of claim 15, further including instructions that direct a processor to:
respond to the element start-event further by activating one or more variables with a variable scope corresponding to the template; and
respond to a paired element end-event further includes deactivating the variables.

17. The computer memory media of claim 15, further including computer program instructions that direct the processor to receive in the event stream one or more mutable variables that can be changed using logical, string or arithmetic operations.

18. A non-transitory computer memory media, including computer program instructions that direct a processor to:
load into memory one or more templates;
process an event stream, including repeatedly
matching a template name for a template to an element name for a start-event in the event stream and, lacking a match, by treating the element between the element start-event and an element end-event as content of a parent element;
buffering an input stream until the end-event matched to the start-event is received; and
process instructions in the template with matching name to transform the buffered input stream, output results of the transform of the buffered input stream and release for reuse memory used for the buffering and to process the instructions.

19. The computer memory media of claim 18, further including instructions that direct a processor to:
activate one or more variables in a scope of the template, upon the matching of the template name; and
deactivate the variables in the scope of the template, upon the release for reuse of the memory.

20. The computer memory media of claim 18, further including computer program instructions that direct the processor to receive in the event stream one or more mutable variables that can be changed using logical, string or arithmetic operations.

* * * * *